United States Patent
Schoon et al.

(10) Patent No.: US 9,926,229 B2
(45) Date of Patent: Mar. 27, 2018

(54) USE OF ORGANIC FIBRE CEMENT AS A RAW MATERIAL IN THE PRODUCTION OF CEMENT CLINKER

(71) Applicants: Cimenteries CBR, Brussels (BE); Redco, Kapelle-op-den-Bos (BE)

(72) Inventors: Joris Schoon, Brussels (BE); Luc Van Der Heyden, Boortmeerbeek (BE)

(73) Assignees: Cimenteries CBR, Brussels (BE); Redco, Kapelle-op-den-Bos (BE)

( * ) Notice: Subject to any disclaimer, the term of this patent is extended or adjusted under 35 U.S.C. 154(b) by 0 days.

(21) Appl. No.: 14/373,609

(22) PCT Filed: Jan. 28, 2013

(86) PCT No.: PCT/EP2013/051577
§ 371 (c)(1),
(2) Date: Jul. 21, 2014

(87) PCT Pub. No.: WO2013/110810
PCT Pub. Date: Aug. 1, 2013

(65) Prior Publication Data
US 2014/0366779 A1  Dec. 18, 2014

(30) Foreign Application Priority Data
Jan. 27, 2012 (EP) .................... 12152942

(51) Int. Cl.
*C04B 16/06* (2006.01)
*C04B 16/02* (2006.01)
*C04B 7/24* (2006.01)

(52) U.S. Cl.
CPC .......... *C04B 16/0641* (2013.01); *C04B 7/246* (2013.01); *C04B 16/02* (2013.01); *C04B 16/0633* (2013.01); *Y02P 40/145* (2015.11)

(58) Field of Classification Search
CPC . C04B 16/02; C04B 16/0633; C04B 16/0641; C04B 7/246; Y02P 40/145
See application file for complete search history.

(56) References Cited

U.S. PATENT DOCUMENTS 4,557,688 A * 12/1985 Nielsen ............... C04B 7/44
432/106
5,096,692 A  3/1992 Ek
(Continued)

FOREIGN PATENT DOCUMENTS

| DE | 43 30 551 A1 | 3/1995 |
|---|---|---|
| JP | 2006-175355 | 7/2006 |
| WO | WO 98/02392 | 1/1998 |

OTHER PUBLICATIONS

"Holderbank Cement Engineering Book". Holderbank Management and Consulting. 2000. Retrieved from https://archive.org/details/HolderbankCementEngineeringBook.*
(Continued)

*Primary Examiner* — Shuangyi Abu Ali
(74) *Attorney, Agent, or Firm* — Reinhart Boerner Van Deuren P.C.

(57) ABSTRACT

Fiber cement material, which contains organic fibers, is used as an additional raw material for the production of cement clinker. The cement clinker is produced in a system which comprises a cyclone tower (11) and a rotating drum kiln (15). The cyclone tower (11) comprises cyclones (1-5) and a pre-calciner unit (10) wherein fuel is combusted to feed the cyclone tower with heat. The raw clinker meal is passed through the cyclone tower to preheat it. By the combustion of the fuel in the pre-calciner unit (10) a hot zone is produced in the cyclone tower wherein the raw clinker meal is calcined. In order to be able to add larger amounts of the fiber cement material without causing a too high total organic carbon content of the exhaust gasses and/or without (Continued)

Figure 1:
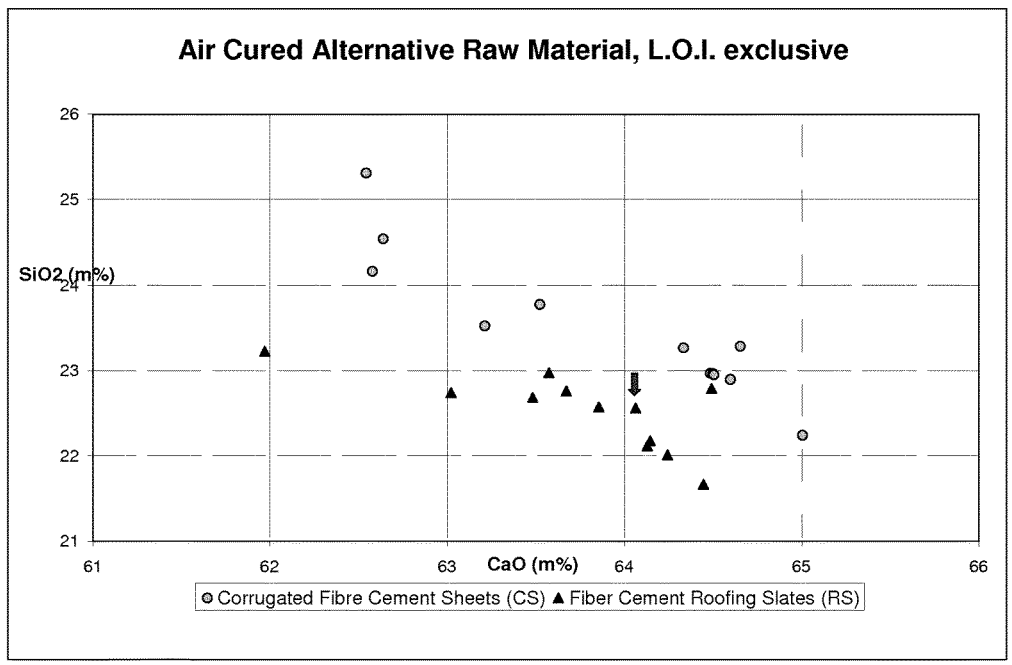

causing depositions of organic matter onto the inner walls of the cyclone tower (11), the organic fiber cement material is added in a dry powdered form in said hot zone, in particular in the pre-calciner unit (10) to be heated in less than 5 seconds to a temperature of at least 800° C.

12 Claims, 10 Drawing Sheets

(56) References Cited

U.S. PATENT DOCUMENTS

| 5,614,016 A | 3/1997 | Hundebøl |
| 2005/0066860 A1 | 3/2005 | Logan et al. |
| 2007/0122762 A1 | 5/2007 | Hoffis et al. |

OTHER PUBLICATIONS

"Cement-bound asbestos products successfully disposed of and recycled in the clinker burning process"; (48.Jahrgang) Nr. Nov. 1995—ZKG International; 2 pages.

"Fibrecement recycling—From the grave back to the cradle"; Global Cement Magazine; Oct. 2010; 3 pages.

* cited by examiner

USE OF ORGANIC FIBRE CEMENT AS A RAW MATERIAL IN THE PRODUCTION OF CEMENT CLINKER

FIELD OF THE INVENTION

The present invention in general relates to the production of cement clinker wherein use is made of fibre cement material, which contains organic fibres, as a raw material in addition to the conventional raw materials which are used for the production of cement clinker. The cement clinker is produced in a system which comprises a cyclone tower and a rotating drum kiln. The cyclone tower comprises heat exchanging cyclones and a pre-calciner unit wherein fuel is combusted to feed the cyclone tower with heat. The rotating drum kiln is heated by means of further fuel which produces a flame at the end of the rotating drum kiln. The raw clinker meal is passed through the cyclone tower to preheat it. By the combustion of the fuel in the pre-calciner unit a hot zone is produced in the cyclone tower wherein the raw clinker meal is heated to a temperature of at least 800° C. in order to calcine the raw clinker meal. The heated and calcined raw clinker meal is fed from the cyclone tower into the rotating drum kiln wherein the raw clinker meal is further heated to be molten and the molten raw clinker meal is subsequently cooled to produce the cement clinker.

BACKGROUND

In June 2005, the World Business Council for Sustainable Development defined 5 Key Performance Indicators within the Cement Sustainability Initiative [J. S. Damtoft et al.]. These indicators cover various subjects like energy reduction and an increasing use of alternative raw materials, as well as the reduction of $CO_2$-emissions that is becoming a key issue in the sustainable development of most companies [H. Mikulcic et al.]. The high temperatures needed to obtain optimal reactivity in clinker kilns, typically about 1500° C., are highly energy-consuming. The raw clinker meal is in particular to be molten partially to provide a liquid phase wherein sintering processes take place. In the current processes, the required energy is delivered by burning both traditional and alternative hydrocarbon fuels as well as and recovered fuel materials. Despite the significant $CO_2$-emissions related to the combustion of these fuel materials, $CO_2$-emissions are mainly generated by the use of limestone as the main raw material for clinker. Limestone, primarily consisting of $CaCO_3$, will release $CO_2$ during decarbonation, delivering CaO as main constituent of alite ($3CaO.SiO_2$), belite ($2CaO.SiO_2$), aluminate ($3CaO.Al_2O_3$) and ferrite ($4CaO.Al_2O_3.Fe_2O_3$) which are the major clinker phases.

The use of alternative fuels based on recycled energy-rich materials or energy-rich non-marketable by-products of e.g. chemical processes is already well established in the cement industry. For example, U.S. Pat. No. 5,614,016 (F. L. Smidth & Co A/S, Denmark, 1997) and US 2007/0122762 A1 (Buzzi Unicem, USA, 2007) disclose the use of several kinds of waste materials which are substantially completely combustible and exothermic, preferably tires and plastics, mixed with the raw material feed and fed into a pre-calcining stage of a cement clinker production process.

On the other hand, the use of alternative raw materials based on recovered materials as replacement for limestone is less frequently implemented. Nevertheless, the replacement of limestone could minimize the effects of quarrying and improve the environmental impact by energy reduction as well as the reduction of $CO_2$ emission, by acting as a non-carbonate CaO source.

US2005/0066860 A1 (T. J. Logan et al. USA, 2005) discloses the use of a mixture of organic waste material (preferably sewage sludge) and mineral by-products (preferably a coal combustion by-product such as fly ash, bottom ash, fluidized bed ash, boiler ash and flue gas desulfurization by-products) in a cement manufacturing process, both as a fuel and combined with the raw material feed to the kiln. The inorganic material content is about 25 to 75 weight %. The mixture is used as a raw material feed in an amount of 10 to 50 weight % based on the total weight of the raw material feed. A fibre cement material is not mentioned, nor a method of production of a cement clinker.

The use of fibre cement material, wherein the fibres don't comprise organic fibres but asbestos fibres, in the production of cement clinker is disclosed in the article "Cement-bound asbestos products successfully disposed of and recycled in the clinker burning process", ZKG International, Bauverlag B V., Getersloh, D E, vol. 48, no. 11, 1 Jan. 1995. Shredded asbestos cement sheets were fine-ground to particle sizes corresponding to a cement raw meal. The asbestos cement meal was injected in the flame of a rotary kiln through the inner pipe of a multi-channel burner in a quantity corresponding to an input of 2% of the raw meal feed to a kiln plant. Due to the very high temperature of more than 1600° C., the asbestos components were destructed. Moreover, no asbestos fibres could be detected in the exhaust gas dust. A drawback of such a destruction method is that the heat exchanging properties of the cyclone tower are not used to preheat the asbestos cement material resulting in higher energy requirements of the kiln, especially when larger amounts of asbestos fibres would be used. Indeed, at the flame of the rotary kiln a certain maximum temperature should be achieved in the clinker production process whilst the addition of relatively cold asbestos cement in this zone of the kiln reduces the temperature in that maximum temperature zone.

In order to avoid fine milling of the fibre cement material, in particular asbestos cement material, WO 98/02392 proposes to only crush the fibre cement material in order to obtain a coarser granulate which can be fed via the inlet feed end into the rotary kiln. Due to the high temperature of about 800° C. at this inlet, no non-destroyed asbestos fibres were exhausted from the kiln.

A method, wherein organic fibre cement material is used as a raw material in the production of cement clinker in a cement manufacturing process as a supplemental source of raw material up to 2 weight % of the total weight of the meal, has been disclosed in Global Cement Magazine, October 2010, pp. 12-16. It is described that the fibre cement material is fed into a hopper from where it is fed into the feeder of a raw clinker meal mill, i.e. it is mixed with and processed along with the conventional clinker meal. At said concentration of 2 weight %, it was concluded that the quality of the clinker still met all quality requirements, especially in terms of amounts of Al, Si, Ca and Fe, and to a lesser extent Mg, K, Na and S, and the emissions to the atmosphere at the kiln's chimney still met all emission limiting values as required by the exploitation permit. An advantage of this method is that by adding to organic fibre cement waste material to the raw clinker materials before grinding them to produce the raw clinker meal, the organic fibre cement material is also preheated in the cyclone tower (which is heated by the kiln gas evacuated from the rotary kiln to recuperate the heat thereof) so that the fibre cement waste material is added, in the same energy efficient way as the other raw materials, to the inlet at the top of the heat exchanging cyclone tower.

The current application discloses however the effects of using large amounts of recuperated organic fibre cement materials as alternative raw material for Portland clinker production and further describes possible boundary conditions and/or limitations. In particular adding larger amounts of organic fibre cement material either to the raw clinker meal feed or directly into the rotary kiln appeared to produce organic compounds which increase the total organic carbon (TOC) content of the exhaust gasses from the clinker production installation and/or which may be deposited onto the inner walls of the cyclone tower (pre-heater).

DESCRIPTION OF THE INVENTION

It is the object of the invention to provide a method for the production of cement clinker in a cement manufacturing process using organic fibre cement as a supplemental source of raw material, such that a cement clinker can be made based on more than 2 weight % of organic fibre cement material relative to the total weight of the raw material feed (=raw clinker meal and organic fibre cement material), without imparting neither the quality of the clinker, nor the emissions to the atmosphere and without causing clogging/pollution of the cyclone tower.

The inventors have now found that organic fibre cement can be used as a supplemental raw material for cement clinker production, in particular Portland cement clinker production, wherein the cement clinker is produced in a system comprising a cyclone tower with heat exchanging cyclones and with a pre-calciner unit wherein fuel is combusted to feed the cyclone tower with heat and a rotating drum kiln which has at least one feed end and which is heated by means of further fuel. In this system the raw clinker meal is passed through the cyclone tower to preheat it, the fuel is combusted in said pre-calciner unit to produce a hot zone in the cyclone tower wherein the raw clinker meal is heated to a temperature of at least 800° C. to calcine it, the heated and calcined raw clinker meal is fed from the cyclone tower via the feed end of the rotating drum kiln into this rotating drum kiln wherein the raw clinker meal is further heated to be molten and the molten raw clinker meal is subsequently cooled to produce the cement clinker. In order to enable the use of larger amounts of organic fibre cement material as supplemental raw material, in particular amounts of more than 2 weight % of fibre cement material relative to the total weight of the raw material feed, the present inventors have found that the organic fibre cement material should be added to the raw clinker meal in the hot zone produced by the combustion in the pre-calcining unit and should be heated in this hot zone in less than 5 seconds to a temperature of at least 800° C.

The organic fibre cement material is preferably added in a dry powdered form. In the present specification the term "dry" means that the material should at least be relatively dry, i.e. it should be at least air dry or it should comprise in particular less than 15 wt. %, more particularly less than 10 wt. % of water (not including the physically bonded water but not the chemically bonded water), based on the total weight of the material. At least 90 wt. % of the particles of the powdery fibre cement material should preferably have a size smaller than 500 μm, preferably smaller than 200 μm and most preferably smaller than 100 μm (so that at least 90 wt. % of these particles pass through a sieve having openings of this size).

In this application, it will further be shown that organic fibre cement material is an interesting candidate for recycling, even at amounts over 50 weight % relative to the weight of the total feed, and that it can be used as supplemental raw material for clinker production, in particular Portland cement clinker production. The expected reduction of $CO_2$ emission as well as the potential energy gains should have a positive effect on the sustainability of cement clinker production, in particular Portland cement clinker production.

DETAILED DESCRIPTION OF THE INVENTION

The present invention will now be described in detail with regard to specific embodiments of the invention. It is understood that the described embodiments are intended only as illustrative examples and, therefore, that the invention is not limited thereto.

According to a first aspect, the invention relates to a method for the production of cement clinker in a system which comprises a cyclone tower followed by a rotating drum kiln. The cyclone tower comprises a number of cyclones (usually at least 4 or even at least 5) and a pre-calciner unit wherein fuel is combusted to feed the cyclone tower with heat (in addition to the heat supplied by the gas coming from the rotating drum kiln and/or from the clinker cooling device, in particular from a grate cooler) to calcine the raw clinker meal at least partially. The rotating drum kiln has at least one feed end and is heated by means of further fuel producing a flame at the outlet end of the rotating drum kiln. In this clinker production method raw clinker meal is passed through said cyclone tower to preheat this clinker meal so that the size of the rotating drum kiln, and the energy requirements, can be reduced considerably compared to systems without a pre-heater, in particular compared to so-called wet kilns or long dry kilns. By the combustion of said fuel in the pre-calciner unit a hot zone is moreover produced in the cyclone tower wherein the raw clinker meal is heated to a temperature of at least 800° C. to calcine it. This calcination embraces at least a decarbonation of the carbonates in the raw clinker meal so that preferably at least 90% of the carbonates in the raw clinker meal are decarbonated (converted into $CO_2$ and in the corresponding oxides). Since the decarbonation of the carbonates in the raw clinker meal requires a lot of energy, the provision of such a pre-calciner enables to further reduce the length and energy requirements of the rotating drum kiln. The heated and calcined raw clinker meal which is heated and calcined in the cyclone tower is fed from this cyclone tower via the feed end of the rotating drum kiln into this rotating drum kiln. In this kiln, the raw clinker meal is further heated to be molten, more particularly in the liquid zone of the kiln where the raw clinker meal is in a liquid phase wherein sintering processes take place, and the molten raw clinker meal is subsequently cooled to produce the cement clinker. The clinker production systems which comprise a pre-calciner unit as in the method of the present invention comprises are so-called calciner kilns which may be in line calciner (ILC) kilns or separate line calciner (SLC) kilns.

According to the invention, a fibre cement material containing organic fibres (i.e. an organic fibre cement material) is added in the hot zone which is produced by the combustion in the pre-calciner unit to said raw clinker meal and is heated in this hot zone in less than 5 seconds to a temperature of at least 800° C. By such a quick heating to such a high temperature, as will be demonstrated later, the organic material will rapidly (i.e. within seconds) decompose and be converted into $CO_2$ without the emission of undesirable amounts of total organic carbon (TOC).

Within the context of the present application, when referring to organic fibre cement material or to fibre cement material which comprises organic fibres, reference is made to a wide variety of composite materials comprising at least (i) Portland cement, typically a OEM I Portland cement, (ii) some mineral filler such as limestone flour and optionally a fine pozzolan, for example condensed silica fume (hereafter (i)+(ii) is called the inorganic material content of fibre cement material), and (iii) a organic fibres or a mixture of several types of organic fibres, typically cellulose, polyvinyl alcohol (PVA) and polypropylene (PP) fibres (hereafter called the organic material content of the fibre cement material).

Cellulose is the most common organic compound on earth. About 33% of all plant matter is cellulose. The primary structure of cellulose is a linear polymer linked together by β-1,glycosidic connections. Polymerization degree can vary between 6000 and 8000 monomers but will decrease in fibre cement to a polymerization degree of 2000 by the presence of alkali from the Portland cement. For the thermal decomposition mechanism of cellulose, there is no conclusive evidence to be found, but it's certain that four components are released: anhydrocellulose, tar (volatile components e.g. levoglucosan), Char (carbonized solid components) and gases (CO, $CO_2$ and $CH_4$). The decomposition reaction mechanism of Broido-Shafizadeh is generally accepted as the most likely mechanism. The formation of each of the 4 components is influenced by the decomposition atmosphere, the heating rate, presence of alkali, etc.

Polyvinyl Alcohol (PVA) has under inert atmosphere two distinctly different temperatures where weight loss occurs during heating. The temperatures are affected by the heating rate but by extrapolation to a heating rate of 0° C./min, the temperatures can be established at 380° C. for the first weight loss peak and 470° C. for the second. In the first step, the dehydration of PVA will occur and high molecular weight single chain polyenes will be formed by chain cut/depolymerisation reactions what could already generate small quantities of acetaldehyde, acetone and furan. In the second step, an excess of decomposition reactions will occur that liberate large quantities of acetaldehyde, acetic acid, acetone and furan and also by Diels-Alder cyclisation reactions, aromatic compounds can be formed (e.g. benzene). The decomposition mechanism of PP is very complex and varies greatly depending on the degree of polymerization, the decomposition atmosphere, the heating rate, the polymer structure (isotactic, syndiotactic, atactic), etc. A long list of possible volatile degradation products could already be formed below a temperature of 150° C. Furthermore chain cut/depolymerisation reactions will generate all kinds of polyenes who will by reducing polymerisation degree become volatile and will be liberated in the gas stream of the kiln.

It was found that thermal decomposition products from cellulose, PVA and PP are not completely degraded when they reach volatility at low temperature when they are introduced, e.g. mixed with the common raw material feed (the meal), and will be picked up by the gas stream coming from the opposite end of the cement kiln. This causes blockage of the cyclone tower and generates an excess of the Total Organic Carbon emission limits at the chimney, especially in the preferred embodiments of the method of the present invention wherein fibre cement material is added in an amount of at least 2 wt. %, preferably of at least 5 wt. % and more preferably of at least 10 wt. %, based on the total weight of raw clinker meal and fibre cement material.

A solution to this problem was found to add the fibre cement raw material directly in the hot zone generated by the combustion in the pre-calciner unit to the raw clinker meal. In the method of the present invention, cement clinker is produced in a system comprising a cyclone tower with cyclones and with a pre-calciner unit wherein fuel is combusted to feed the cyclone tower with heat and a rotating drum kiln which has at least one feed end and which is heated by means of further fuel. Raw clinker meal is passed through said cyclone tower to preheat it, said fuel is combusted in said pre-calciner unit to produce a hot zone in the cyclone tower wherein the raw clinker meal is heated to a temperature of at least 800° C. to calcine it, the heated and calcined raw clinker meal is fed from the cyclone tower via the feed end of the rotating drum kiln into this rotating drum kiln wherein the raw clinker meal is further heated to be molten and the molten raw clinker meal is subsequently cooled to produce the cement clinker. In accordance with the present invention, the fibre cement material containing organic fibres is added in said hot zone to said raw clinker meal and is heated in said hot zone in less than 5 seconds to a temperature of at least 800° C.

Due to the high temperature in this hot zone of the cyclone tower the fibre cement material is heated in this hot zone in less than 5 seconds (in particular 1 to 5 second), or even preferably in less than 2 seconds, to a temperature of at least 800° C. More preferably, the fibre cement material is heated in the hot zone to a temperature of at least 900° C., and this in particular also in less than 5 seconds or even in less than 2 seconds. In this way, a nearly complete thermal degradation of the organic material in the fibre cement is obtained in a few seconds, for example 1 to 10 seconds. The organic matter is thus nearly completely thermally degraded and converted into $CO_2$ without the emission of significant amounts of TOC. Typically, using the method according to the invention, at least 85% of the organic material present in the fibre cement material is converted into $CO_2$ in the cyclone tower, in particular in the pre-calciner unit thereof, during those 1 to 5 seconds at a temperatures of at least 800° C. It is important that the amount of TOC remains within the emission limits as set by the law where the cement clinker process plant is operated.

In an advantageous embodiment, the fibre cement material is added in the pre-calciner unit itself to the raw clinker meal. Due to the combustion of the fuel in this pre-calciner unit, the fibre cement material is very quickly heated to the required high temperature in this pre-calciner unit.

In a further advantageous embodiment, the fibre cement is added in a dry powdered form in said hot zone to said raw clinker material. Preferably, a rising gas stream is generated in the cyclone tower wherein the fibre cement material is dispersed in said dry powdered form.

In practice a rising gas stream is generated in the cyclone tower by means of one or more induced draft fans (ID fans) provided at the top of the cyclone tower. The fibre cement material which is supplied in a dry powdered form in this cyclone tower is thus finely dispersed in this gas stream thus ensuring an almost instantaneous heat transfer and thus a quick heating of the fibre cement material. In practice, the flow of gas through the cyclone tower is controlled in such a manner that the gas contained in the rising gas stream passing through the pre-calciner unit has a retention time of at least 2 seconds, preferably of at least 3 seconds, in this pre-calciner unit. In view of the quick decomposition of the organic matter in the powdery fibre cement material, no or nearly no organic compounds will be exhausted from the cyclone tower by the gas stream passing therethrough. The flow rate of this gas stream is quite high since the raw clinker meal has to be kept suspended by this gas stream in the cyclone tower. Organic compounds produced by the decomposition of organic matter is thus quickly removed by this gas stream so that a quick complete decomposition is required to avoid too high TOC values in the exhaust gases.

A further advantage of dispersing the fibre cement material in the rising gas stream is that an intensive mixing with the raw clinker meal is achieved. A homogeneous material flow will thus enter the rotary kiln, ready for the clinkering process, even when relatively large amounts of fibre cement material is added. When adding to fibre cement material to the rotary kiln, it would not be mixed so efficiently with the raw clinker meal so that the clinker forming chemical reactions would not take place correctly or at least not optimally. Moreover, the fibre cement material would not be heated quickly enough to the required high temperature so that organic compounds would be produced which would be evacuated very quickly by the large draft of gases which are removed by the ID fan(s) out of the kiln. In modern kilns, which have low energy requirements, the raw clinker meal is always preheated in a cyclone tower and the rotating drum kiln is only heated by one flame at the end thereof. Feeding the organic fibre material at this high temperature end of the rotating drum kiln to achieve a quick decomposition of the organic matter is not an appropriate solution as it would increase the energy requirements of the kiln, especially when larger amounts of organic fibre materials are used (since there in no preheating of these materials so that they lower the temperature of the maximum temperature zone of the kiln), as it would be difficult to achieve the required intensive mixing of the raw materials and as by the short residence time of the fibre cement material in the kiln not all of the required chemical/physical conversions may have been achieved to obtain a high quality clinker material.

The fibre cement material is preferably lifted by the rising gas stream, in particular when this powdery fibre cement material is fed to a riser duct. When a fine particle is introduced in such a rising gas stream, there are in principle 2 forces acting on this particle. One is FG, the gravity force, and the other is FW, the dynamic lifting force. The critical rising gas velocity, in which the particle will be lifted, can be calculated as follows;

$$V = (4 \times g \times d_p \times \rho_p / 3 \times c_W \times \rho_L)^{1/2}$$

g=gravity force (9,815 m/s$^2$)
$d_p$=particle diameter in (m)
$\rho_p$=particle density (kg/m$^3$)
$c_W$=friction factor based on the shape factor of particles
$\rho_L$=gas density in riser duct (m/s).

The fibre cement material is ground preferably to such a small particle size that the particles will be lifted in the rising gas stream, in particular flow from the riser duct towards the bottom cyclones.

In a preferred embodiment, the fibre cement material which is dispersed in a dry powdery form in the gas stream in the cyclone tower is removed from this gas stream by means of at least one of the heat exchanging cyclones and is supplied by this heat exchanging cyclone to the feed end of the rotating drum kiln.

In a further preferred embodiment, oxygen is supplied to the cyclone tower in such an amount that after the calcination (i.e. the decarbonation) of the raw clinker meal and the combustion of said fuel in the cyclone tower, the rising gas stream contains at least 2 vol. % and preferably at least 3 vol. % of oxygen. This ensures a substantially complete combustion of the fuel and also a substantially complete decomposition of the organic matter contained in the organic fibre cement material.

The organic fibre cement material is not a fuel but it is a raw material. It has indeed an inorganic material content of at least 80 dry weight %, preferably at least 85 dry weight % and more preferably at least 90 dry weight %, based on the total dry weight of the fibre cement material.

Although the fibre cement material has only a quite small organic matter content which can produce energy when it is decomposed by an exothermic reaction, it was found that the produced amount of energy is higher than the amount of energy required to decarbonate the fibre cement material as it contains, in contrast to the conventional raw clinker materials, only a small amount of carbonates (produced by the natural carbonation of the cement materials). Consequently, it was found that this organic fibre material can be effectively added to the higher temperature zone of the cyclone tower (at the downstream end thereof) without increasing the energy requirements of this cyclone tower. On the contrary, less energy is required. Moreover, by feeding the fibre cement material at the bottom part of the cyclone tower, less raw clinker meal has to be fed at the top thereof so that a smaller gas stream is required reducing the ID fan power consumption and thus the energy requirements per ton clinker produced. In some cases, where the ID fan is the limiting factor, a higher kiln-output can be achieved.

According to one embodiment of the invention, the fibre cement materials are fibre cement sheets. Although typically between 4 mm and 6 mm, fibre cement sheets may have a range of sizes. Sheets are the common products manufactured using fibre cement, commonly used as roofing slates and façade products, such as corrugated fibre cement sheets, fibre cement roofing slates, and medium or high density fibre cement boards.

According to one embodiment, the fibre cement materials are fibre cement sheets produced by Hatschek technology. The sheet formation principle in the so-called Hatschek machine resembles very much the principle of an old wet paper making-machine. By means of a rotating sieve, thin layers of material (ca. 0.3 mm) are picked up from an aqueous suspension of cement, fibres, fillers and water (ca. 80 to 120 g solids/l of slurry), making up the fibre cement slurry. Usually, a Hatschek machine contains 3 to 4 sieves mounted in series. Fibre cement composites with varying thicknesses can be made by winding of several layers of these 3 to 4 monolayers holding composites on a so-called forming drum. The fresh sheet is optionally post-compressed to densify or is optionally passed through a moulding station in order to make corrugated sheets or accessory fibre cement products. The products harden by normal hydration of Portland cement at ambient pressure, hereafter indicated by "air-curing" or by means of hydrothermal calcium-silicate reactions, further indicated by "autoclaving". Except for the crystalline portlandite, the products formed by normal hydration mainly concern calcium silicates with predominantly amorphous or cryptocrystalline nature. In the case of autoclaving, the calcium silicate reactions brought about in an atmosphere of saturated steam at 7 to 10 bar mainly lead to crystalline phases next to some less crystalline and even some XRD-amorphous materials. Most commonly used CaO sources are Portland cement and hydrated lime. Quartz is the preferred SiO$_2$ source, but the silica present in the Portland cement also participates in the reactions.

Using the method according to the invention, it is now possible to use much higher amounts of fibre cement material in the raw material as a feed for the production of cement clinker than the amounts disclosed in the prior art. It was demonstrated that amounts as high as about 52 weight %, based on the total weight of the raw material feed could be used without imparting the quality of the clinker, especially in terms of amounts of Al, Si, Ca and Fe, and to a lesser extent Mg, K, Na and S, while the emissions to the atmosphere at the kiln's chimney still met all emission limiting values as required by the exploitation permit. Hence, according to one embodiment, an amount of fibre cement material is used ranging between 0.001 and 80 weight %, preferably, between 1 and 20 weight %, relative to the total weight of the raw material feed.

In the following, the cement clinker manufacturing process will be described briefly. Cement clinker is manufactured by blending limestone ($CaCO_3$) with clay and other mineral ingredients such as sand and iron to create a raw material feed (meal). After being preheated and pre-calcined in a cyclone tower, the raw material feed is introduced into a rotating drum kiln. A rotating drum kiln is basically a rotating cylinder lined with heat-resistant bricks. The raw material feed is fed into the higher, elevated or "cold" end of the kiln, typically at a temperature of about 800° C. As the kiln slowly rotates, the raw material feed tumbles down towards the lower of "hot" end of the kiln where a flame is burning, fed by classical energetic materials, such as coal, oil, petroleum coke, natural gas or energetically rich waste materials such as waste paints, solvents, tires and plastics, typically at a temperature of about 1450° C. When passing through the cyclone tower and during its descend through the rotating drum kiln, gradually, the physical and chemical properties are altered, one of which is the calcination of the limestone (e.g. conversion of limestone into lime (CaO), liberating $CO_2$) and the calcined mixture is molten. The smelt is cooled as it exits the kiln and precipitates as clinker. Subsequently, clinker is finely ground, often with a small amount of gypsum, to produce cement.

Basically, there are two types of cement clinker manufacturing processes: the wet process and the dry process. In the wet process, raw material in a powdered or granular form is blended with water to produce an aqueous slurry which is pumped directly into the cold end of the rotating drum kiln (there is no pre-heater cyclone tower). The slurrying process helps homogenizing the material. The wet process is the most energy-intensive because the water must be evaporated out of the slurry.

In the dry process the raw material is fed into the kiln in a relatively dry powdered or granular form. Basically, there are three embodiments of the dry process, using either a pre-heater unit or a pre-calciner unit in front of a rotating kiln, or a long dry kiln. A pre-heater unit features a tower of heat-exchanging cyclones. The raw material is fed into the pre-heater unit in a dry powdered form to achieve a temperature of at least 800° C. where it is pre-heated by the hot exit gases exiting of the upper end of the rotating kiln, before the raw material enters the rotating kiln. A pre-calciner unit is similar to a pre-heater unit, except that in the cyclone tower a separate combustion is provided which promotes further calcination of the raw material at a temperature of at least 800° C. In a long dry kiln, dry raw material is fed directly into the upper end of the rotating drum kiln. Such a long dry kiln is provided with a mid-kiln feed opening, usually used to feed fuel to the kiln at a temperature of at least 800° C.

The invention is also related to a method for the production of cement clinker in a system comprising a heated rotating drum kiln having at least one feed end for receiving a raw material feed, wherein fibre cement material, which comprises organic fibres, is introduced into said feed end of said kiln. The system further comprises a pre-calciner unit having an inlet end and an outlet end communicating with the feed end of the kiln, the pre-calciner operable to partially or fully calcinate a raw material feed passing from the inlet end of the pre-calciner unit into the feed end of the kiln. In this method, the fibre cement material is introduced into the pre-calciner unit in a hot zone which is at a temperature of at least 800° C. The fibre cement material is thus added to the raw material feed in the pre-calciner unit.

Advantageously, the fibre cement material is heated up to the temperature of said hot zone in 1 to 5 seconds, preferably in less than 2 seconds.

Preferably, the fibre cement material is introduced into said pre-calciner unit is a dry powdered form.

The invention will now be substantiated using experiments. The following figures are referred to:

LIST OF FIGURES

FIG. 1: CaO [weight %] in function of $SiO_2$ [weight %] without Loss of Ignition (950° C.) of Air-cured Fibre cement materials. The arrow marks the selected Air-cured Fibre cement sample ARM/RS/S7.

Figure 2:
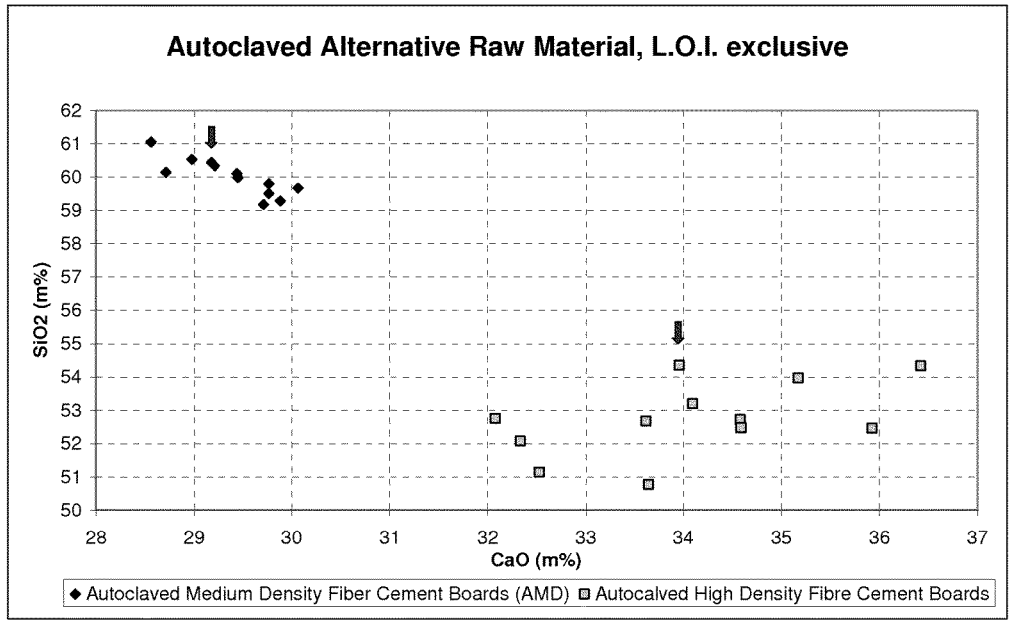

FIG. 2: CaO [weight %] in function of $SiO_2$ [weight %] without Loss of Ignition (950° C.) of Autoclaved Fibre cement materials. The arrows mark the selected Autoclaved Fibre cement samples ARM/HD/S8 and ARM/MD/S5.

Figure 3:
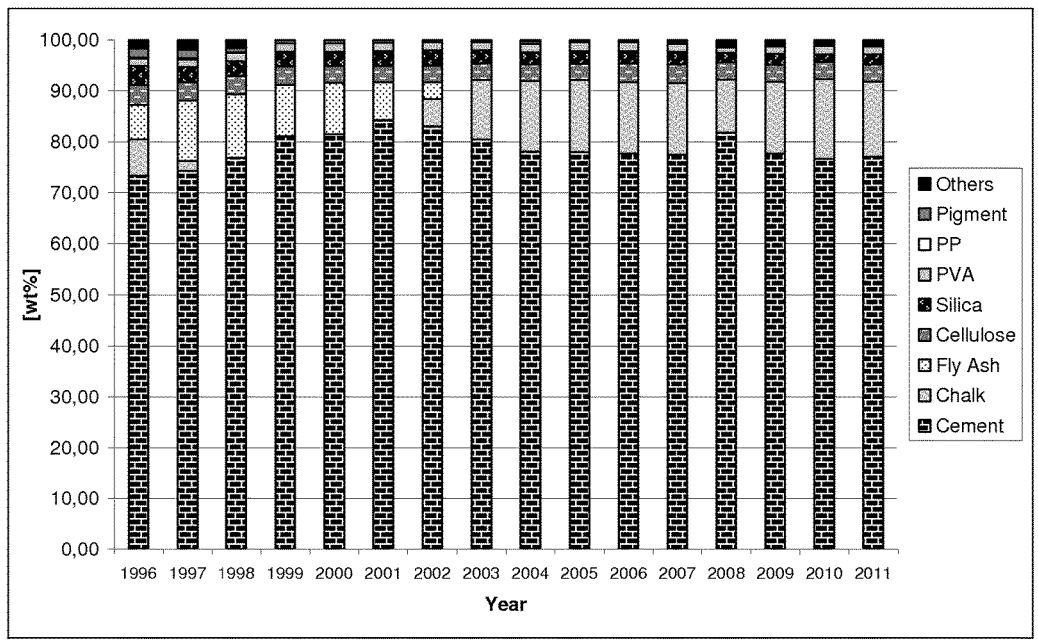

FIG. 3: Evolution of the Composition of Air-cured Fibre cement Roofing Slates produced in Eternit Kapelle o/d Bos (Belgium).

Figure 4:
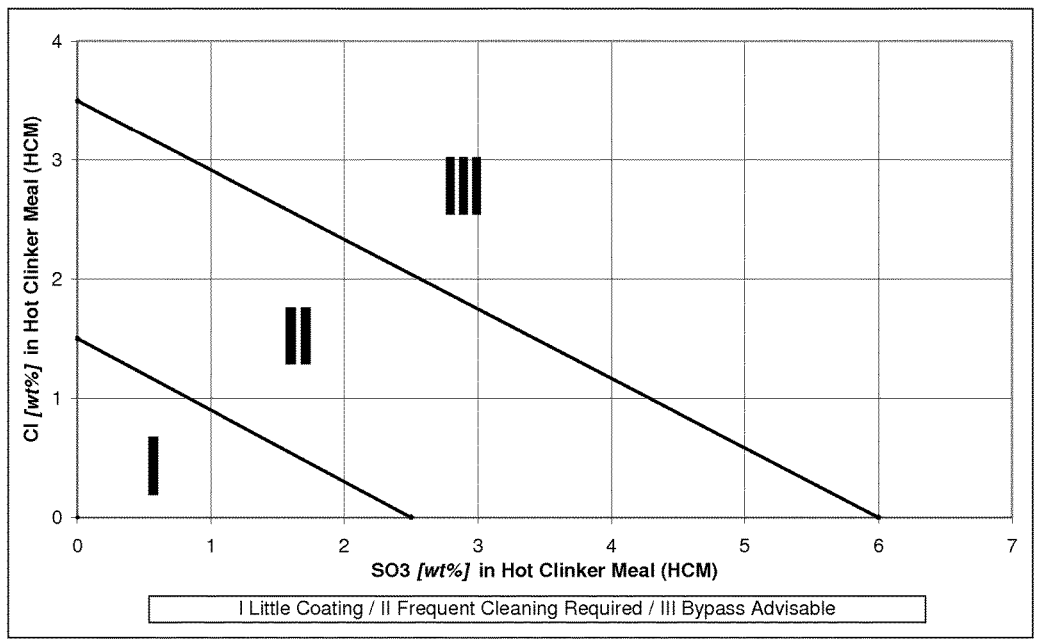

FIG. 4: Increasing clogging Levels in function of $SO_3$ [weight %] and Cl [weight %] of Hot Clinker Meal.

Figure 5:
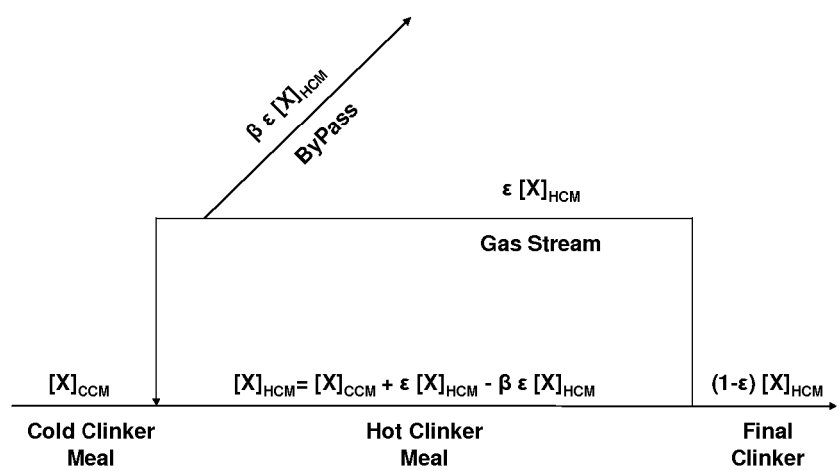

FIG. 5: Circulation diagram of volatiles by gas and HCM stream (X=[$SO_3$], [Cl], [$Na_2O$], [$K_2O$] of the HCM).

Figure 6:
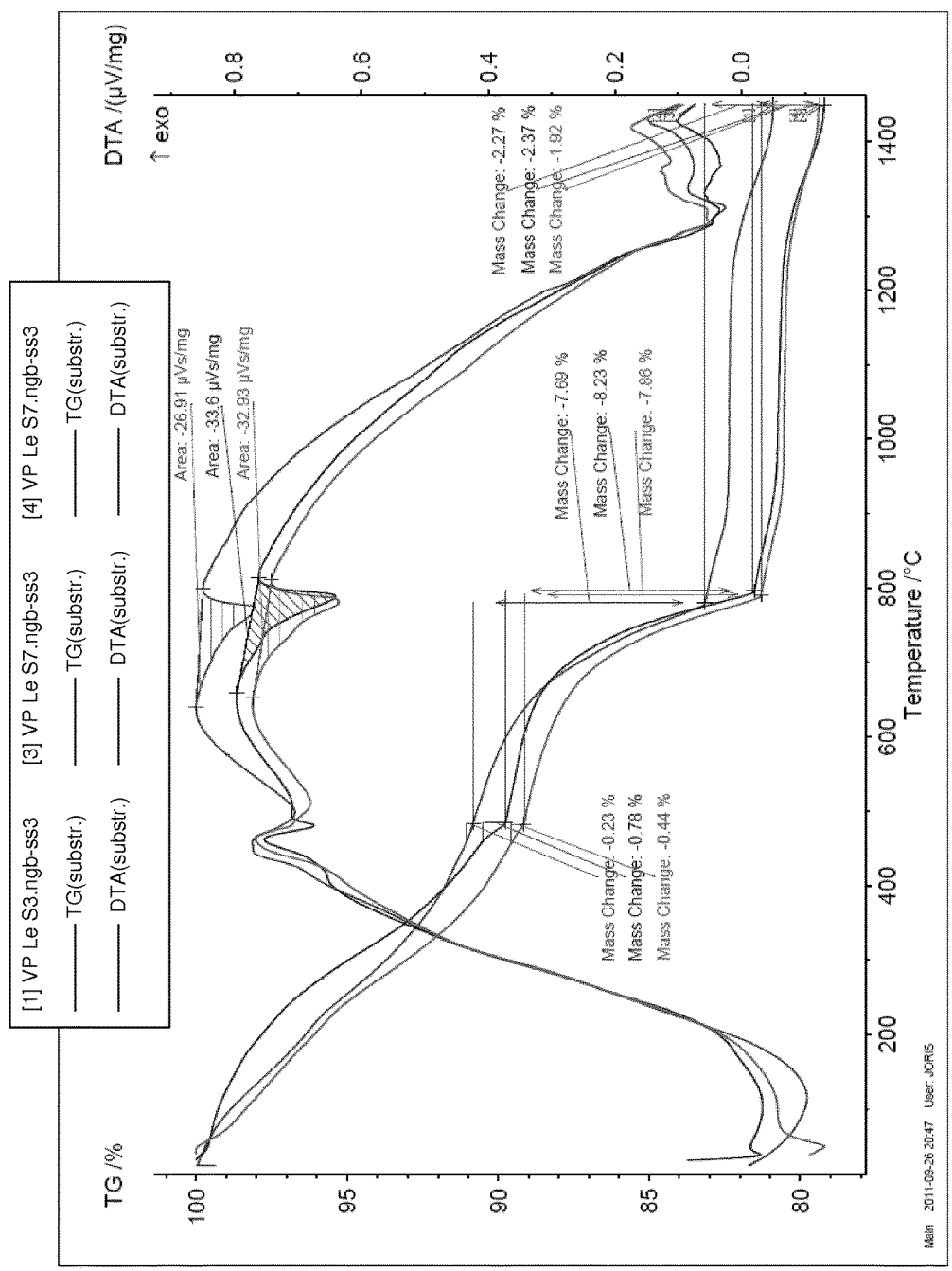

FIG. 6: TGA/DTA analysis of Air-cured Fibre cement Roofing Slates (RS).

Figure 7:
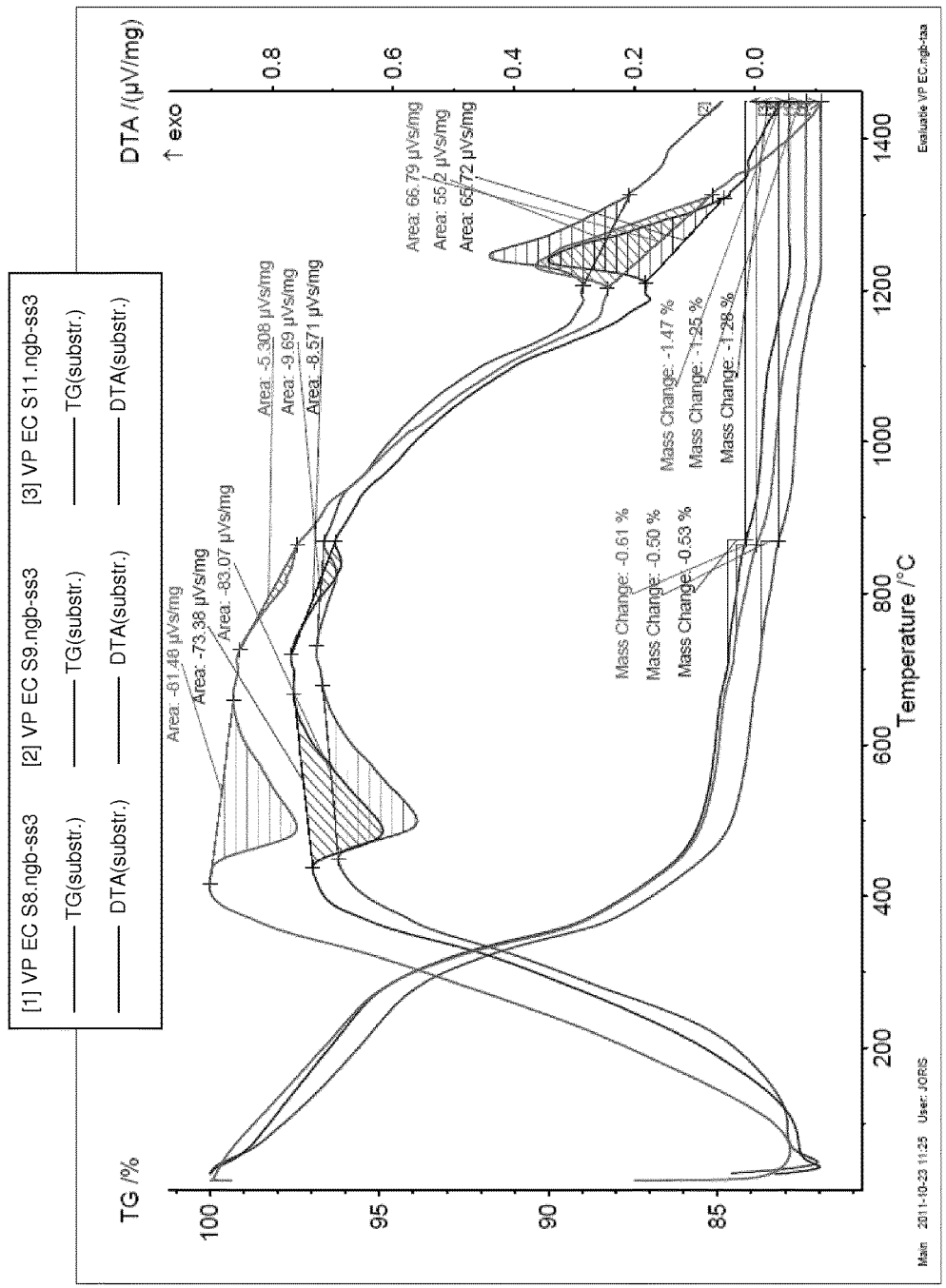

FIG. 7: TGA/DTA analysis of Autoclaved High Density Fibre cement materials (HD).

Figure 8:
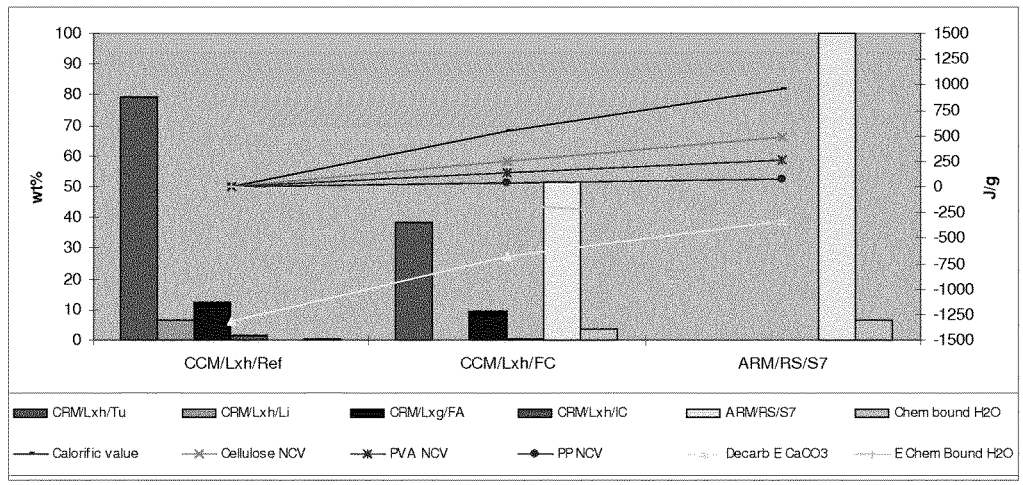

FIG. 8: Compositions, $H_2O$ weight %, Decarb E and gross calorific values+net calorific values of the organic fibres of cold clinker meals for CBR Lixhe and the used Air-cured Fibre cement Roofing Slate ARM sample (ARM/RS/S7).

Figure 9:
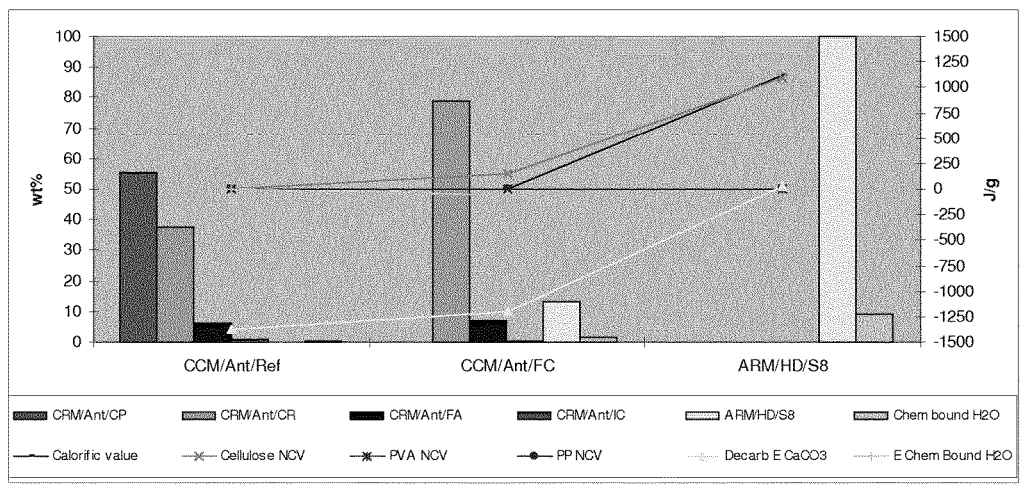

FIG. 9: Compositions, $H_2O$ weight %, Decarb E and gross calorific values+net calorific values of the organic fibres of cold clinker meals for CBR Antoing and the used autoclaved High Density Fibre cement ARM sample (ARM/HD/S8).

Figure 10:
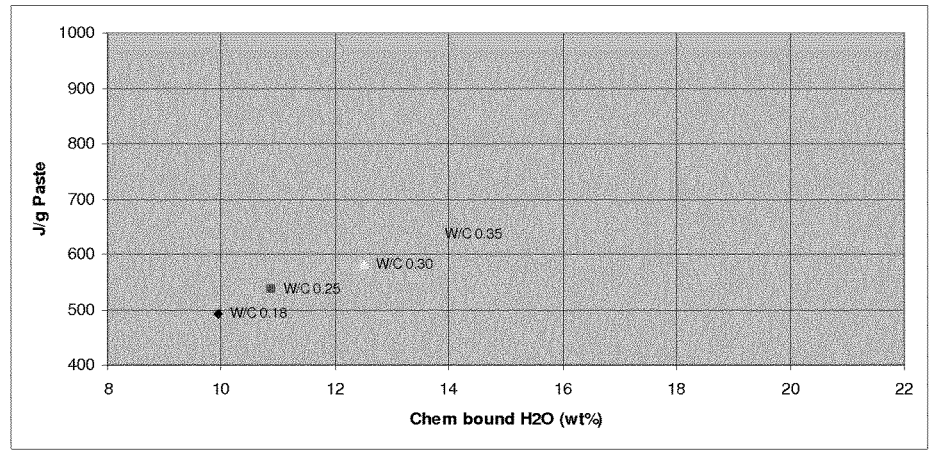

FIG. 10: Endothermal dehydration energies for Portland based cement pastes.

Figure 11:
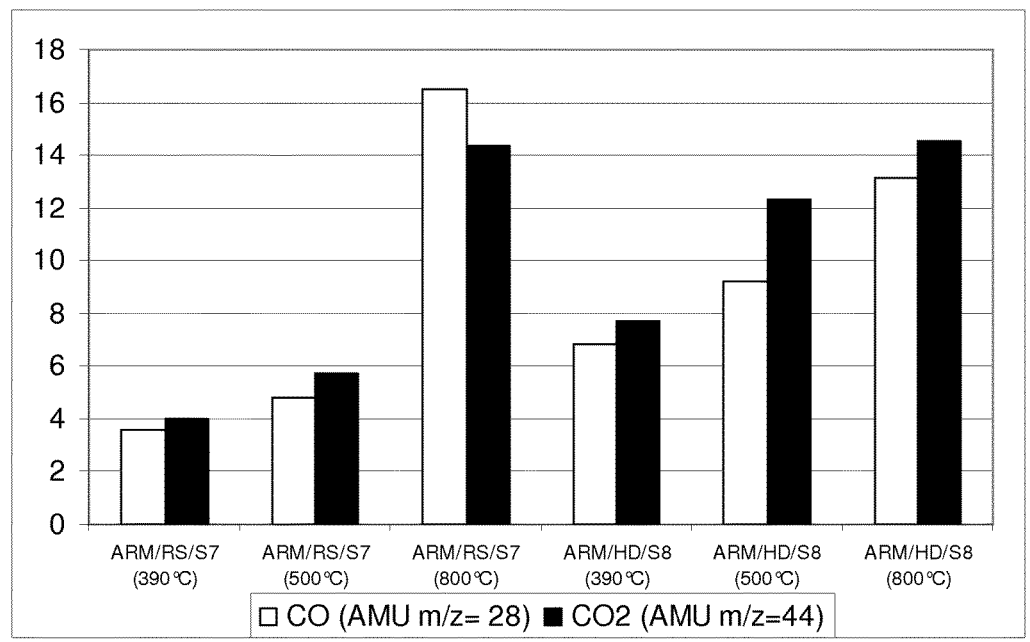

FIG. 11: Integral calculation of the CO and $CO_2$ measurement graphs of air-cured and autoclaved samples measured by MS.

Figure 12:
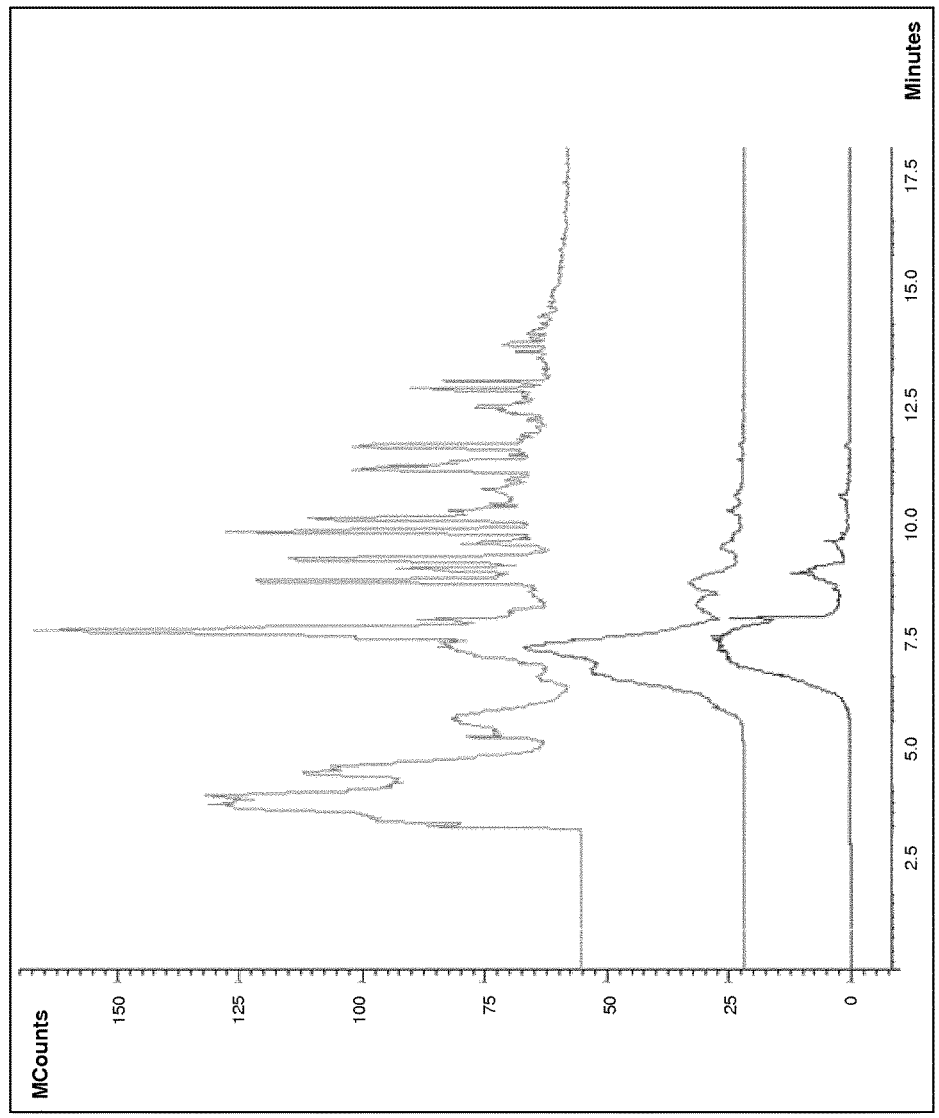

FIG. 12: GC-MS measurement from bottom to top at 390° C., 500° C. and 800° C. (air cured).

Figure 13:
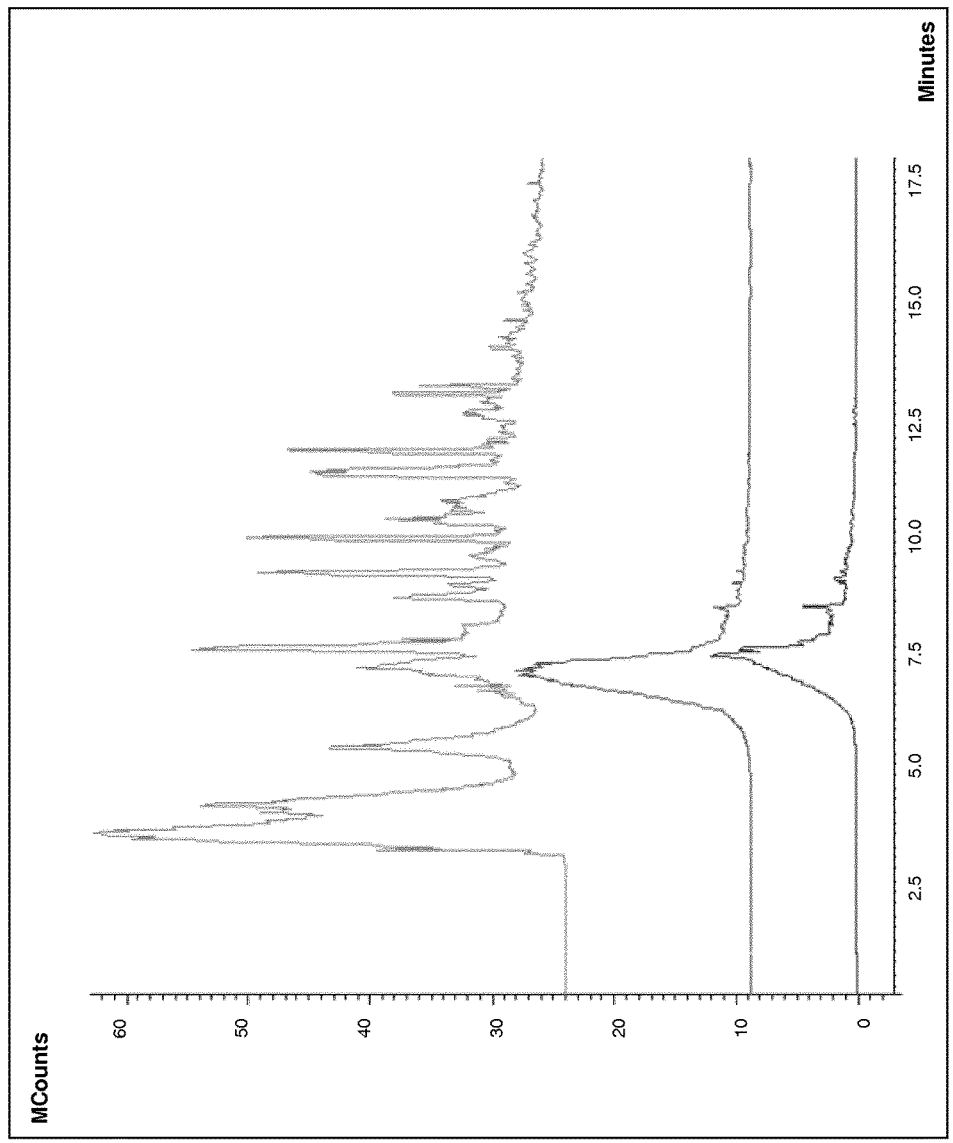

FIG. 13: GC-MS measurement from bottom to top at 390° C., 500° C. and 800° C. (autoclaved).

Figure 14:
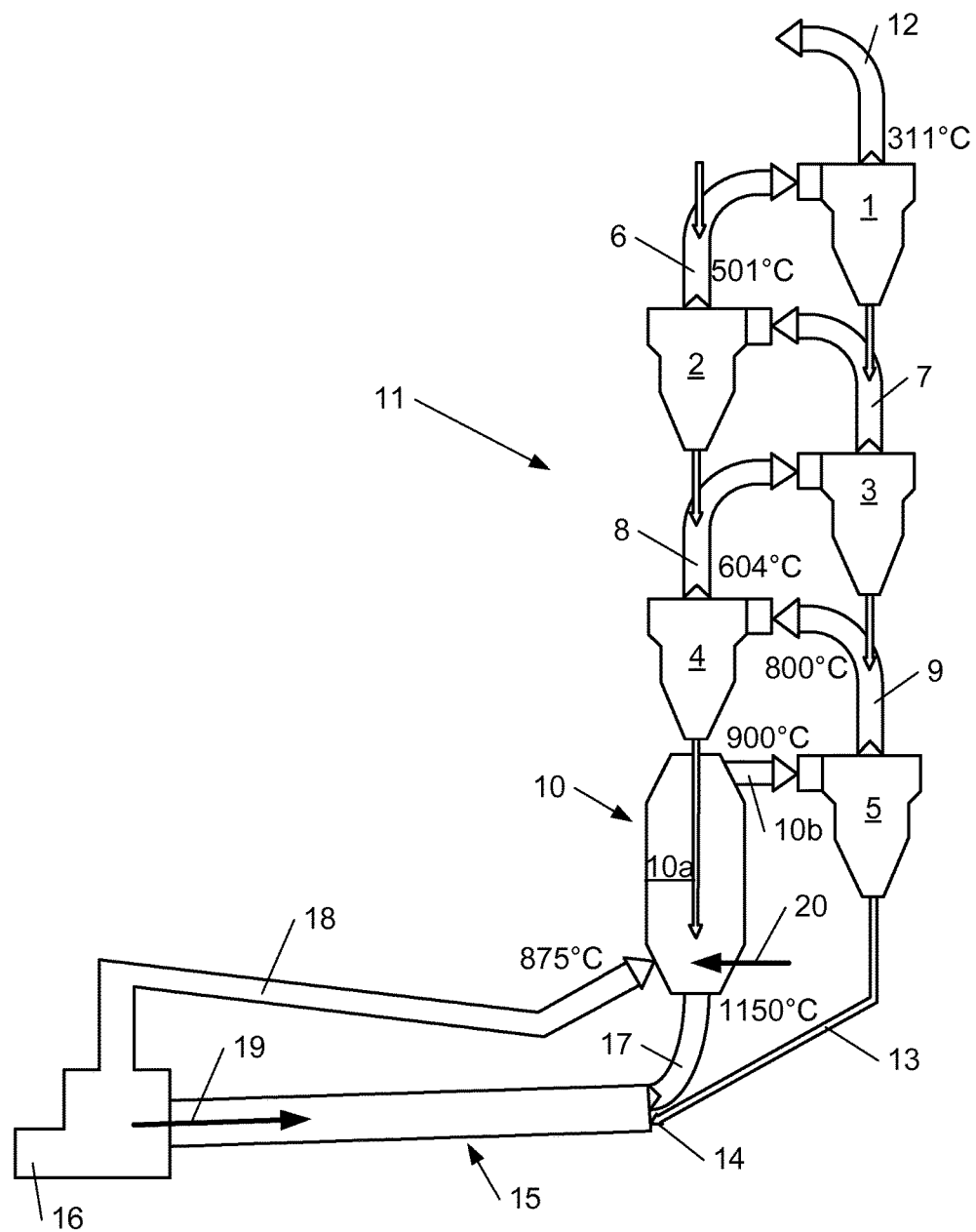

FIG. 14: Schematic representation of an in-line calciner kiln.

As appears from the above description, the method of the present invention is to be performed in a kiln which comprises a pre-calciner unit creating the hot zone wherein the fibre cement material is to be added to the raw clinker meal. Such kilns are most advantageous from the point of view of energy consumption and enable the most efficient use of the organic fibre cement materials, also in quite large relative amounts thereof.

In practice there are different types of cement clinker installations which comprise a pre-calciner unit, namely In-Line Calciners (ILC) and Separate Line Calciners (SLC). More particularly, the present invention can be applied to so-called pre-heater kilns, air through calciners, inline calciners, inline calciners with burning chamber and air separate calciners. Such installations are well known to the skilled person so that only as an example an in-line calciner will be described shortly hereinafter.

As illustrated schematically in FIG. 14, an in-line calciner comprises a number of cyclones, in this case five cyclones 1 to 5 connected by means of four riser ducts 6 to 9, and a pre-calciner unit 10 forming together a heat exchanging cyclone tower 11. By means of an induced draft fan (ID fan) in the exhaust pipe 12, a rising gas stream is generated in the cyclone tower 11. The raw clinker meal is normally introduced in the riser duct 6 between the second cyclone 2 and the first cyclone 1. After having passed the cyclone tower 11 the heated and at least partially calcined (decarbonated) raw clinker meal is led via a kiln feed pipe 13 to the feed end 14 of the rotating drum kiln 15. Since it has passed the pre-calciner unit 10, wherein a temperature in the range of 870-900° C. is generated, the degree of calcination of the material introduced in the rotating drum kiln 15 is between 90 and 95%. The material is then transported through the kiln 15 by the combination of the kiln inclination and the rotating movement thereof. At the end of the rotating drum kiln 15 a burner is provided producing a flame with air supplied through this burner in the kiln as indicated by arrow 19. As the material approaches the flame, the material temperature rises and clinkerisation occurs. Upon leaving the kiln, the material discharges onto a grate cooler 16 where it exchanges heat with secondary air so as to be cooled to produce the cement clinker.

In the present specification, the term pre-calciner unit 10 has to be understood as including not only the actual pre-calciner vessel but also the riser duct leading towards the last cyclone 5 before the rotating drum kiln 15 since it forms one volume with the cavity of the actual pre-calciner vessel and a same high calcining temperature prevails therein so that the material passing through the pre-calciner vessel is further calcined in the riser duct part of the pre-calciner unit 10. In order to heat this pre-calciner unit 10, and to generate a rising gas stream therein, combustion gases produced by the combustion in the rotating drum kiln 15, i.e. kiln gas which has a temperature of about 1000° C., is guided through the kiln riser duct 17 to the bottom of the pre-calciner unit 10. Moreover, tertiary air, heated in the grate cooler 16 to a temperature of about 750-900° C., is also guided, by a tertiary air duct 18, to the pre-calciner unit 10. This tertiary air enters the pre-calciner unit 10 tangentially to create a moderate swirl ensuring an effective mixing of fuel, raw meal and gas. The temperature in the pre-calciner unit 10 is further controlled by means of a burner supplied with fuel and with primary air. The air for combustion of the fuel in the pre-calciner unit thus consists of kiln gas, tertiary air from the cooler and fuel conveying/atomising air supplied through the pre-calciner burner in the pre-calciner unit as indicated by arrow 20. About 55 to 60% of the fuel is supplied to the pre-calciner burner whilst the remaining amount of fuel (40 to 45%) is supplied to the kiln burner.

In the method of the present invention, organic fibre cement material is added, in a dry powdered form, to the raw clinker meal. The organic cement fibre is added to this raw clinker meal in a hot zone in the cyclone tower where the organic fibre material is heated quickly, in less than 5 seconds, to a temperature of at least 800° C. The organic cement fibre is preferably added in the pre-calciner unit 10, more particularly in the vessel 10a of the pre-calciner unit 10 or in the riser duct 10b of this pre-calciner unit 10 leading from this vessel towards a final cyclone. In this way, it is dispersed in the rising and swirling gas stream in the pre-calciner unit and an instantaneous heat transfer is achieved. Heating is moreover accelerated by the high temperature of the fuel which is combusted in the pre-calciner unit. In fact, the organic fibre material passes the combustion zone of this fuel so that it is heated, in less than 5 seconds or even in less than 2 seconds, to a temperature of at least 900° C.

Instead of feeding the organic fibre cement material directly into the pre-calciner unit 10, it can also be fed therein via the kiln riser duct 17. In fact, by the rising gas stream in this kiln riser duct 17, the organic fibre cement powder is immediately carried along into the pre-calciner unit 17 where it is added, in the hot zone within the pre-calciner unit 10, to the raw clinker meal.

EXPERIMENTAL

1 Materials and Methods 1.1. Classic Raw Materials (CRM)

As representative CRM, materials are selected that are used at a daily base in three reference clinker factories. These factories are CBR Antoing (CRM/Ant) and CBR Lixhe (CRM/Lxh) in Belgium and ENCI Maastricht (CRM/Maa) in the Netherlands, all belonging to the Heidelberg Benelux group. From each of these three grey Portland clinker factories, four of their most important CRM were collected, more specifically those that act as the main sources of the four critical metal oxides in clinker: CaO, $SiO_2$, $Al_2O_3$ and $Fe_2O_3$. CBR Antoing uses two kinds of limestone: Rich (CFM/Ant/CR) and Poor (CFM/Ant/CP). These act as CaO and $SiO_2$ sources. CBR Lixhe uses Tufa (CFM/Lxh/Tu) and Loam (CFM/Lxh/Lo), ENCI Maastricht a typical Marl (CFM/Lxh/Ma) and Sabulous Clay (CFM/Lxh/SC) as CaO and $SiO_2$ source respectively. All 3 factories use Fly Ash (CFM/Ant,Lxh,Maa/FA) as $Al_2O_3$ source and an artificially produced $Fe_2O_3$ source (CFM/Ant,Lxh,Maa/IC). All four of the CRM from each clinker factory were sampled at three different instances. To generate representative samples, the separate samples from each factory were homogenised. These representative samples were grinded for 2 minutes in a Siebtechnic disc mill to obtain sufficient fineness to perform analytical testing. The average chemical analysis of the limestones, as measured by XRF is presented in Table 1.

TABLE 1

Average Chemical analysis of the Limestones of CBR Antoing (Ant), CBR Lixhe (Lxh) and ENCI Maastricht (Maa) in weight %.

| CRM | CRM/Ant/PL | CRM/Ant/RL | CRM/Lxh/Tu | CRM/Maa/Ma |
|---|---|---|---|---|
| CaO | 42.9 | 50.1 | 51.8 | 50.8 |
| $SiO_2$ | 15.1 | 6.4 | 4.7 | 7.1 |
| $Al_2O_3$ | 2.2 | 0.9 | 0.4 | 0.8 |
| $Fe_2O_3$ | 0.9 | 0.4 | 0.3 | 0.4 |
| $K_2O$ | 0.68 | 0.21 | 0.07 | 0.13 |
| $Na_2O$ | 0.25 | 0.25 | 0.02 | 0.20 |

TABLE 1-continued

Average Chemical analysis of the Limestones of CBR Antoing (Ant), CBR Lixhe (Lxh) and ENCI Maastricht (Maa) in weight %.

| CRM | CRM/Ant/PL | CRM/Ant/RL | CRM/Lxh/Tu | CRM/Maa/Ma |
|---|---|---|---|---|
| $SO_3$ | 0.90 | 0.57 | 0.09 | 0.21 |
| MgO | 1.1 | 0.9 | 0.7 | 0.8 |
| Cl | — | — | 0.011 | — |
| LOI 975° C. ($O_2$) | 35.04 | 40.18 | 42.03 | 40.18 |

1.2. Alternative Raw Material (ARM): Fibre Cement

The fibre cement materials used for this investigation were taken from four different production lines, corresponding with two roofing products, Corrugated fibre cement Sheets (ARM/CS) and fibre cement Roofing Slates (ARM/RS), and two façade products, Medium Density fibre cement boards (ARM/MD) resp. High Density fibre cement boards (ARM/HD). The roofing products concern air-cured products whereas the façade products are autoclaved. The air-cured products have very similar formulations and contain synthetic reinforcement fibres (Polyvinyl Alcohol and Polypropylene), process fibre (cellulose), Portland cement, pozzolanic and inert filler. The corrugated sheets (ARM/CS) contain twice as much pozzolanic filler as the slates (ARM/RS). The final corrugated sheet density amounts to values between 1.45 and 1.50 g/cm³. In case of the slates, the density is about 1.85 g/cm³. The autoclaved products mainly contain cellulose reinforcement and cellulose process fibres, Portland cement, quartz flour and some stabilizing agent. Furthermore, they each contain some product-specific additional functional mineral filler(s). The product's final density amounts to respectively 1.30 and 1.85 g/cm³ for Medium Density fibre cement boards (ARM/MD) and High Density fibre cement boards (ARM/HD) respectively. For each ARM source, material was recovered at 24 different points of time spread over 6 months after which they were 2 by 2 homogenised. After crushing in a Retsch cutting mill those samples were ground for 1 minute in a Siebtechnic disc mill to obtain sufficient fineness. For each of the 4 types of fibre cement product, the average chemical analysis determined by XRF of the 12 samples is presented in Table 2.

TABLE 2

Average chemical analysis of the fibre cement materials in weight %

| ARM | Corrugated Fibre cement Sheets ARM/CS | Fibre cement Roofing Slates ARM/RS | Autoclaved High Density Fibre cement Boards ARM/HD | Autoclaved Medium Density Fibre cement Boards ARM/MD |
|---|---|---|---|---|
| CaO | 51.24 | 52.14 | 28.55 | 25.01 |
| $SiO_2$ | 18.85 | 18.42 | 44.2 | 51.06 |
| $Al_2O_3$ | 2.80 | 3.55 | 5.95 | 4.95 |
| $Fe_2O_3$ | 2.52 | 3.15 | 2.37 | 1.74 |
| $K_2O$ | 0.37 | 0.28 | 0.22 | 0.15 |
| $Na_2O$ | 0.20 | 0.17 | 0.06 | 0.12 |
| $SO_3$ | 1.87 | 1.35 | 0.69 | 0.61 |
| MgO | 1.38 | 1.57 | 0.59 | 0.71 |
| $TiO_2$ | 0.25 | 0.43 | 0.34 | 0.38 |
| $P_2O_5$ | 0.44 | 0.31 | 0.16 | 0.18 |
| Cl | 0.03 | 0.01 | 0.01 | 0.01 |
| LOI 975° C. ($O_2$) | 19.65 | 18.11 | 16.13 | 14.83 |
| $C_{total}$ | 3.94 | 4.10 | 3.66 | 3.44 |
| $S_{total}$ | 0.86 | 0.66 | 0.33 | 0.31 |

The mutual relationship between the CaO and the $SiO_2$ content is graphically illustrated in FIGS. 1 and 2 for the air-cured and autoclaved products respectively. FIG. 3 illustrates how the compound composition of the roofing slates (air-cured) applied at the fibre cement plant from which the samples for this study were taken, has evolved through the years since the change-over to non-asbestos products. Based on FIG. 3, we may conclude that fibre cement product-selective recycling will generate an alternative raw material with a low chemical variation over time.

1.3. Testing of Raw Materials, Clinker and Cement Properties

To prepare the different CCM compositions, all raw materials were crushed in advance in a Siebtechnic Disc mill. The calculated dosage to achieve 500 g of CCM were brought together in a vessel used for the analysis of the micro-Deval abrasion resistance. This procedure was used to homogenise as good as possible the raw meal before it was thermally treated in a kiln. Before sintering, the different CCM compositions were first granulated on granulation plates (5 mm holes). The sintering was performed in an electric high temperature static kiln (Carbolite BLF1800) to 1450° C. at a constant heating rate (10° C./min). The Hot Clinker Meals (HCM) were maintained for 1 h at 1450° C. after which they were immediately air-cooled to room temperature by open air to form the final clinker. XRF analyses were performed on a Philips PW2404 in accordance with EN 197-2 to chemically characterise the classic (CRM) and alternative raw materials (ARM), all cold clinker meals (CCM) and final clinkers. For the analysis of the total C and S, a Leco CS230 was used. A Netzsch STA 449F3 was used to evaluate by TGA/DTA measurement all the CRM and selected ARM as well as all the CCM compositions on their thermal decomposition mechanism as also on the energy required during their heating up to 1450° C. and were performed in an atmosphere of 5 V % $O_2$ and 95 V % $N_2$ which corresponds with the typical V % $O_2$ in the atmosphere of a clinker kiln. A Mettler Toledo Star TGA/DTA was used to evaluate the same materials in a pure $N_2$ gas atmosphere, as also to evaluate by TGA/DTA the cement pastes described in Paragraph 3.2 in an atmosphere of 5 V % $O_2$ and 95 V % $N_2$. As heating rate, 10° C./min was chosen for both devices which gave the best resolution for evaluation of the graphs. Of course, an industrial clinker process will exhibit a much higher heating rate, e.g. 600° C./min in a cyclone tower, most probably resulting in other reaction products for heating rate sensitive compounds like the organic fibres in the ARM. XRD analyses were performed on a Bruker D8 ADVANCE refined by Rietveld method to mineralogically characterise all the final clinkers. These analyses were only performed on the Final Clinkers. An IKA calorimeter system C7000 was used to measure the gross calorific values of the CCM and the selected fibre cement ARM in accordance with ISO 1928. A Mettler Toledo Star DSC was used to determine the required energy for the liberation of chemically bound $H_2O$ on the cement pastes described in Paragraph 3.2. Four pastes were made out of 450 g CEM I type cement and W/C ratios of 0.25, 0.30, and 0.35. To obtain the paste with the lowest W/C ratio (0.18), a paste with a W/C ratio of 0.21 was made, which was subsequently filtered off in view of obtaining a still lower W/C ratio. The pastes were stored for 28 days at 20±1° C. hermetically wrapped in plastic and were afterwards dried at 105° C. at the respective curing times that had been selected. For the analysis of the formed volatiles after thermal degradation of the organic fibres in fibre cement ARM, a Varian GC (3900)-MS (Saturn 2100T) was used and for the formed gases, a MS Balzers Quadstar 422.

2 Theory/Calculation 2.1. Chemical and Mineralogical Limitations of Each Reference Clinker and Clinker Kiln For each clinker factory, the chemical and mineralogical data of the clinkers produced in the first 6 months of 2011, was used to define the reference clinker of each clinker factory (Table 3).

TABLE 3

The average chemical composition of the reference clinker of each clinker factory in weight %

| Clinker | Antoing Average | Lixhe Average | Maastricht Average |
|---|---|---|---|
| CaO | 65.90 | 65.87 | 64.92 |
| $SiO_2$ | 21.42 | 21.42 | 20.40 |
| $Al_2O_3$ | 4.44 | 4.84 | 5.01 |
| $Fe_2O_3$ | 2.61 | 3.65 | 3.52 |
| $K_2O$ | 0.74 | 0.57 | 0.47 |
| $Na_2O$ | 0.21 | 0.30 | 0.34 |
| $SO_3$ | 1.21 | 0.51 | 0.92 |
| MgO | 1.70 | 2.01 | 2.08 |
| Cl | 0.068 | 0.017 | 0.020 |
| CaO free | 1.46 | 0.55 | 2.33 |
| LSF_MgO | 98.24 | 98.19 | 98.20 |
| C3A | 7.35 | 6.65 | 7.33 |
| LiqSimple | 19.18 | 22.73 | 22.97 |

To prevent undesirable effects on both the clinker production process as well as on the clinker quality and to remain within the framework of the cement standards, chemical and mineralogical limits specific for each clinker factory were defined and used to evaluate the feasibility of applying fibre cement as an alternative raw material (Table 4).

TABLE 4

Chemical and mineralogical limitations on the final clinker in weight %

| Clinker | Antoing | Lixhe | Maastricht |
|---|---|---|---|
| Cl | x < 0.08 | x < 0.08 | x < 0.08 |
| $SO_3$ | x < 1.4 | x < 1.2 | x < 1.1 |
| $Na_2Oeq$ | x < 1.2 | x < 1.2 | x < 1.2 |
| MgO | x < 4.0 | x < 4.0 | x < 4.0 |
| DoS-level | 80.0 < x < 120.0 | 80.0 < x < 120.0 | 80.0 < x < 120.0 |
| LSF_MgO | 98.5 < x < 98.5 | 98.5 < x < 98.5 | 98.5 < x < 98.5 |
| $C_3A$ | 7.4 < x < 7.4 | 6.7 < x < 6.7 | 7.3 < x < 7.3 |
| LiqSimple | 19.2 < x < 19.2 | 22.7 < x < 22.7 | 23.0 < x < 23.0 |

One of possible problems in a clinker kiln concerns clogging of material on the sides of the kiln, by which the smooth operation of the clinker kiln can be disturbed. This explains why the $SO_3$, $Na_2Oeq$ and Cl contents of the clinkers produced in the three reference clinker factories have to meet even stricter limits than those required in order to be in line with the cement standards.

$SO_3$ [weight %] is the general form to describe all $SO_4^{2-}$ [weight %] present in clinker or cement. $SO_4^{2-}$ can occur mineralogically in Portland clinker in different forms with their own specific solubility and will be particularly present in the alite ($C_3S$) and belite ($C_2S$) phases. $SO_3$ will generally be formed after oxidation of S compounds in a clinker kiln. High concentrations of S are often present in pet coke fuel where contents up to 3 to 6 weight % are commonly found.

When taking into account their respective dosages in the raw meal mixture, also limestone, clay or blast furnace slag, used as raw materials, can bring significant levels of S or $SO_3$ in clinker, like can be noted in Table 1. In an alkali-rich environment, mainly installed by Na and K from the raw materials, these sulphates can be found particularly in the form of alkali sulphates. If no sufficient $SO_3$ content is available to combine all Na and K into sulphates, the majority of the free alkali will be built into the Belite phase. The free alkali will increase viscosity of the melt and decrease the formation of Alite. Also an excess of alkali emitted to the gas phase of a clinker kiln by its high volatility, will make that clogging phenomena will appear faster. This could lead to faster wear of the refractory bricks. However when the amount of $SO_3$ strongly exceeds the amount that can be bound by the alkali, $CaSO_4$ will be formed, whereas in the case of a moderate excess of $SO_3$ several other forms of alkali sulphates will dominate like arcanite, aphihitalite, thenardite and calcium langbeinite. In addition an imbalance between alkali and $SO_3$ could damage the furnace process and have negative influences on the clinker quality and by that on the final cement hydration. Like described above, a stoichiometric balance is imposed, expressed as the so called DoS value calculated by equation (1) using the chemical analysis of the final clinker.

$$DoS = 77.41 \cdot SO_3 / (Na_2O + K_2O \cdot 0.658) \quad (1)$$

DoS levels between 80 to 120 weight % are recommended and therefore implemented in the three factories. For this reason these DoS levels will be retained in all simulations presented in this work. Increasing levels of Cl as well as $SO_3$ have increasing levels in the gas phase of a clinker kiln increase clogging and therefore disturbed process. As shown in FIG. 4, based on the Cl [weight %] and $SO_3$ [weight %] present in the Hot Clinker Meal (HCM) the risk for kiln clogging/coating can be evaluated, and classified (Little Coating, Frequent Cleaning Required, Bypass Advisable). Each factory is different with regard to its clinker raw meal materials and technical installations. How these differences work out on the Cl and $SO_3$ (and alkaline) content of final clinker is described by the so-called enrichment factor ($\epsilon$). Further, levels of Cl and $SO_3$ can be lowered by the presence of a bypass installation ( ) which allows for higher content of Cl and $SO_3$ of the Hot Clinker Meal (HCM). These considerations are described in FIG. 5 and by the linear equation (2) which will be used in the simulation program described in paragraph 2.3.

$$[X]_{HCM} = [X]_{CCM} + \epsilon_{X} \cdot [X]_{HCM} - \beta_X \cdot \epsilon_X \cdot [X]_{HCM} = [X]_{CCM} / [1 - \epsilon_X (1 - \beta_X)] \quad (2)$$

(X=Cl, $SO_3$, $K_2O$ or $Na_2O$)

Based on this assumption, limits on Cl and $SO_3$ can be set for the Final Clinker. If exceeded, this will result in disturbances in the function of the kiln. The introduction of fibre cement materials will not markedly change the Cl content of the kiln feed because the Cl content of fibre cement ARM is very low and in line with the other CRM. Actually, Cl is especially brought in by fuel materials such as waste oils, tires, plastics, animal meals, etc. In the present investigation the fuel mix is not adapted. So instead of putting a limitation on a parameter in that $SO_3$ and Cl are taken into account, the requirement by which "safe" combinations of $SO_3$ and Cl contents are guaranteed can be simplified to a $SO_3$ limitation (max) on the raw meal as listed for each clinker factory in Table 4. These $SO_3$ limitations were derived from FIG. 4 by using equation (2) for $SO_3$ and Cl with the specific $\epsilon$ and $\beta$ factors of each clinker kiln and the average Cl of each reference clinker (Table 2). With respect to the mineralogy of the final clinker, limits are defined for the following 3 parameters: $C_3A$, Lime Saturation Factor (LSF) and the liquid phase (LiqSimple) [5]. The limits on these mineralogical limits are actually merely chemical limitations related to the contents of the 4 most important metal oxides in the clinker (CaO, $SiO_2$, $Al_2O_3$ and $Fe_2O_3$). The LSF_MgO governs the ratio of alite and belite and concerns a refined version of the normal Lime Saturation Factor, by the fact that it holds a correction for the incorporation of MgO in $C_3S$. In equation (3) also the presence of free lime is taken into account.

$$LSF\_MgO = 100 \cdot (CaO - CaO_{free} + 0.75 \cdot MgO) / (2.8 \cdot SiO_2 + 1.18 \cdot Al_2O_3 + 0.65 \cdot Fe_2O_3) \quad (3)$$

The approximative calculation of the $C_3A$ content is done by a commonly known Bogue calculation described in equation (4).

$$C_3A = (2.650 \cdot Al_2O_3 - 1.692 \cdot Fe_2O_3) \quad (4)$$

The composition of the liquid at 1450° C. is to a high extent governed by the ratio of $Al_2O_3$ to $Fe_2O_3$. In the simulations of the present study the combined influence of these 2 components is expressed by means of a parameter defined by the simplified equation (5).

$$LiqSimple = (3 \cdot Al_2O_3 + 2.25 \cdot Fe_2O_3) \quad (5)$$

By limiting the three above parameters for the final clinker, the 4 metal oxides are sufficiently anchored within a safe zone for each factory. Actually, in the present study, the 3 parameters were each given fixed, but factory dependent, values as displayed in Table 4. Also MgO has to be monitored because of its limitation within the cement standards. Though this parameter was not critical in this investigation as levels were very low.

2.2. Emissions and Energy Consumption

The diversity of compounds that the organic materials of fibre cement can liberate by heating them up to 1450° C. makes it almost impossible to quantify these compounds completely. With thermogravimetric analysis (TGA)/differential thermal analysis (DTA), gas chromatography-mass spectrometry (GC-MS) and mass spectrometry (MS) measurements, an effort is made to analyse the organic compounds formed after thermal degradation at specific temperatures. A specific test setup was designed to heat the selected fibre cement samples as fast as possible up to a specific temperature. The selection of the temperatures considered for these tests resulted from the evaluation of the TGA/DTA analyses and the literature study on the decomposition of the organic fibres present in the fibre cement ARM. In this specific test a quartz reactor is loaded with 400 mg of sample under a gas flow of 95 V % He and 5 V % $O_2$ connected to a GC-MS to measure the volatiles with a high molecular weight and to a MS to measure the gases with a low molecular weight. The recipient was preheated to heat up the sample as fast as possible to the selected temperature after which, over a period of 5 minutes, all gases and volatiles generated, were measured. The heating rate as well as the V % $O_2$ in the surrounding gas flow was set to be comparable with those present in a real clinker kiln. The knowledge of the amount as well as the nature of these volatiles and gases is important in view of the determination of the ideal point of introduction of the fibre cement ARM in the clinker kiln. Because organic compounds are present in the fibre cement ARM and an additional energetic benefit is expected from the reduced endothermic decarbonation part, it is interesting to comparatively evaluate the energy necessary to heat the classic cold clinker meal up to 1450° C., with that necessary for doing the same but with alternative cold clinker meal. TGA/DTA and calorimetric measurements were performed to give an idea of this possible energetic gain. On the other hand, the presence of chemically bound $H_2O$ in the fibre cement ARM also implies loss of energy while heating. The energy required to liberate the chemically bound $H_2O$ is not so easy to quantify because of a variety of hydration products that are generated upon the hydration of cement. By performing DSC analyses on cement pastes with different W/C ratios like those described in paragraph 1.3., an effort is made to estimate the required energy to liberate the chemically bound $H_2O$. The pastes are made with the OEM I cement presently used at the fibre cement plant from that the fibre cement production waste for this study was taken to produce fibre cement.

2.3. Different Clinker Feed Calculations and Preparations

Of each factory, a simulation program based on linear equations calculated raw meal compositions (CCM/Ant, Lxh,Maa/Ref) in line with the chemical and mineralogical requirements listed in Table 4. These compositions indicated as Classic cold Clinker Meals (CCM) are very close to the compositions actually used in these factories. The composition of the raw materials was merely adjusted to obtain the mineralogical settings, but without taking into account the ashes of the fuels that will actually be used to heat up the clinker meal. The compositions of these classic Cold Clinker Meals are presented in Table 5.

TABLE 5

Compositions of the different clinkers made to be fed to the StaticKiln.

| | CRM + ARM | Quantity (weight %) | | CRM + ARM | Quantity (weight %) | | CRM + ARM | Quantity (weight %) |
|---|---|---|---|---|---|---|---|---|
| CCM/Ant/Ref | CRM/Ant/CP | 55.25 | CCM/Lxh/Ref | CRM/Lxh/Tu | 79.44 | CCM/Maa/Ref | CRM/Maa/Ma | 84.38 |
| | CRM/Ant/CR | 37.50 | | CRM/Lxh/Li | 6.63 | | CRM/Maa/SC | 2.90 |
| | CRM/Ant/FA | 6.38 | | CRM/Lxg/FA | 12.34 | | CRM/Maa/FA | 11.02 |
| | CRM/Ant/IC | 0.87 | | CRM/Lxh/IC | 1.59 | | CRM/Maa/IC | 1.70 |
| | ARM/HD/S8 | 0.00 | | ARM/RS/S7 | 0.00 | | ARM/MD/S5 | 0.00 |
| | Sum | 100.00 | | Sum | 100.00 | | Sum | 100.00 |
| CCM/Ant/FC | CRM/Ant/CP | 0.00 | CCM/Lxh/FC | CRM/Lxh/Tu | 38.52 | CCM/Maa/FC | CRM/Maa/Ma | 81.89 |
| | CRM/Ant/CR | 79.08 | | CRM/Lxh/Li | 0.00 | | CRM/Maa/SC | 0.00 |
| | CRM/Ant/FA | 7.03 | | CRM/Lxh/FA | 9.32 | | CRM/Maa/FA | 10.33 |
| | CRM/Ant/IC | 0.61 | | CRM/Lxh/IC | 0.53 | | CRM/Maa/IC | 1.77 |
| | ARM/HD/S8 | 13.28 | | ARM/RS/S7 | 51.63 | | ARM/MD/S5 | 6.01 |
| | Sum | 100.00 | | Sum | 100.00 | | Sum | 100.00 |

Furthermore alternative compositions were calculated with the same program and limits, aiming at the maximisation of the use of the fibre cement ARM. These alternative Cold Clinker Meals compositions are also presented in Table 5. The chemical analyses of the limestone in Table 1 show that the limestone of Antoing have a high $SO_3$ content, by which that kiln already operates close to the $SO_3$-limit (Table 4) in the routine condition. Therefore it's not realistic to increase the $SO_3$-content of the Hot Clinker Meal (HCM) of Antoing any further. After simulation, it is clear that the introduction of Air-cured ARM increases the $SO_3$-content of the Hot Clinker Meal (HCM) because of its higher level of $SO_3$ compared with that of the CRM of CBR Antoing. Unlike Air-cured ARM, the use of Autoclaved ARM lowers the $SO_3$ in the HCM since its $SO_3$ content is lower than that of the two types of limestone used by CBR Antoing. Clogging phenomena should logically decrease by the lower $SO_3$ content of the HCM. Therefore, it was chosen to maximise the Autoclaved ARM with the highest CaO [weight %] namely Autoclaved High Density Fibre cement Boards (ARM/HD) in the CCM/Ant/FC as presented in Table 5. The limestone used by CBR Lixhe has a S content that is much lower than the limestone of Antoing. Also the S feed by the fuel mix is limited. Therefore the $SO_3$-content of the HCM is not as critical as the one of CBR Antoing. An increase of the $SO_3$ [weight %] could therefore be accepted. By maximisation of the air-cured ARM in the CCM/Lxh/FC, the $SO_3$ [weight %] of the simulated final clinker was increased to 0.73 weight % which was still below the maximum of 1.2 weight % (Table 4) that is allowed for and in line with the limits set for the DoS factor. It should be noted that in the simulated final clinker, the fuel mix was not taken in account. Performed simulations with the typical fuel mix of CBR Lixhe showed an $SO_3$ increase of about 0.25 weight % which still is sufficiently below the maximum limit. The limestone or marl used by ENCI Maastricht contains a higher S content than the limestone or tufa used by CBR Lixhe. Also the used fuel mix brings more S to the HCM compared to the fuel mix of CBR Lixhe. All this results in a higher $SO_3$ [weight %] in the reference clinker of ENCI Maastricht compared to the reference Clinker of CBR Lixhe (Table 3). Also the maximum allowed $SO_3$ [weight %] is lower than that of CBR Antoing. The $SO_3$ [weight %] could therefore not be changed significantly what automatically suggests the use of Autoclaved ARM. In the case of ENCI Maastricht, the Autoclaved ARM are still quite high in $SO_3$ [weight %] compared to the used limestone or marl. This differentiates the use of autoclaved ARM in this plant from that in the CBR Antoing. Because the Autoclaved ARM from Autoclaved Medium Density Fibre cement Boards (ARM/MD) were the lowest in $SO_3$ [weight %], they were maximised in the CCM/Maa/FC like presented in Table 5.

3 Results and Discussion 3.1. Chemical Analysis

The Chemical analyses of the CRM, ARM and CCM are presented in Tables 1, 2 and 6, that of the final Clinkers in Table 10.

TABLE 6

Chemical analysis of the Cold Clinker Meals (CCM) fed to the static kiln in weight %

| CCM | CCM/Ant/Ref | CCM/Ant/FC | CCM/Lxh/Ref | CCM/Lxh/FC | CCM/Maa/Ref | CCM/Maa/FC |
|---|---|---|---|---|---|---|
| CaO | 43.48 | 44.63 | 45.26 | 47.92 | 44.79 | 44.85 |
| $SiO_2$ | 14.00 | 13.56 | 12.01 | 14.03 | 12.83 | 12.71 |
| $Al_2O_3$ | 2.89 | 2.72 | 2.90 | 3.35 | 3.09 | 3.05 |
| $Fe_2O_3$ | 1.84 | 1.80 | 2.72 | 2.65 | 2.42 | 2.40 |
| $K_2O$ | 0.59 | 0.33 | 0.41 | 0.32 | 0.39 | 0.34 |
| $Na_2O$ | 0.11 | 0.10 | 0.13 | 0.12 | 0.13 | 0.13 |
| $SO_3$ | 0.48 | 0.41 | 0.24 | 0.81 | 0.28 | 0.29 |
| MgO | 1.10 | 0.94 | 0.88 | 1.18 | 0.97 | 0.96 |
| $TiO_2$ | 0.16 | 0.26 | 0.21 | 0.29 | 0.20 | 0.21 |
| $P_2O_5$ | 0.12 | 0.12 | 0.15 | 0.23 | 0.09 | 0.10 |
| Cl | 0.02 | 0.02 | 0.04 | 0.04 | — | — |
| LOI 975° C.($O_2$) | 34.89 | 34.79 | 34.75 | 28.61 | 34.51 | 34.68 |
| $C_{total}$ | 8.98 | 8.89 | 8.82 | 6.66 | 8.79 | 8.76 |
| $S_{total}$ | 0.36 | 0.25 | 0.09 | 0.36 | 0.15 | 0.16 |

TABLE 10

Chemical analysis and Bogue calculations of the Final Clinkers produced in a static kiln

| Clinker | | Cl/Ant/Ref | Cl/Ant/FC | Cl/Lxh/Ref | Cl/Lxh/FC | Cl/Maa/Ref | Cl/Maa/FC |
|---|---|---|---|---|---|---|---|
| CaO | (weight %) | 65.90 | 66.71 | 66.28 | 65.61 | 66.18 | 66.44 |
| $SiO_2$ | (weight %) | 22.27 | 22.72 | 21.93 | 21.53 | 21.39 | 21.56 |
| $Al_2O_3$ | (weight %) | 4.14 | 3.97 | 4.40 | 4.77 | 4.54 | 4.45 |
| $Fe_2O_3$ | (weight %) | 3.02 | 2.79 | 4.21 | 3.81 | 3.98 | 3.99 |
| $K_2O$ | (weight %) | 0.59 | 0.24 | 0.21 | 0.25 | 0.33 | 0.29 |
| $Na_2O$ | (weight %) | 0.17 | 0.14 | 0.20 | 0.20 | 0.21 | 0.19 |
| $SO_3$ | (weight %) | 0.89 | 0.44 | 0.12 | 0.58 | 0.36 | 0.29 |
| MgO | (weight %) | 1.73 | 1.48 | 1.28 | 1.7 | 1.52 | 1.44 |
| $TiO_2$ | (weight %) | 0.25 | 0.39 | 0.30 | 0.40 | 0.30 | 0.3 |
| $P_2O_5$ | (weight %) | 0.21 | 0.20 | 0.24 | 0.33 | 0.17 | 0.16 |
| Cl | (weight %) | n.a. | n.a. | n.a. | n.a. | n.a. | n.a. |
| LOI 975° C.($O_2$) | (weight %) | 0.48 | 0.39 | 0.39 | 0.33 | 0.48 | 0.45 |

TABLE 10-continued

Chemical analysis and Bogue calculations of the Final Clinkers produced in a static kiln

| Clinker | Cl/Ant/Ref | Cl/Ant/FC | Cl/Lxh/Ref | Cl/Lxh/FC | Cl/Maa/Ref | Cl/Maa/FC |
| --- | --- | --- | --- | --- | --- | --- |
| DoS-factor | 123.42 | 114.33 | 27.47 | 123.18 | 65.24 | 58.95 |
| Alite ($C_3S$) | 66.84 | 68.19 | 67.52 | 65.92 | 70.61 | 70.97 |
| Belite ($C_2S$) | 13.44 | 13.71 | 11.95 | 12.01 | 8.07 | 8.29 |
| Aluminate ($C_3A$) | 5.86 | 5.80 | 4.54 | 6.20 | 5.30 | 5.04 |
| Ferrite ($C_4AF$) | 9.19 | 8.49 | 12.81 | 11.59 | 12.11 | 12.14 |

The average analyses of the CRM were as expected and were therefore directly used in the simulation program. The analyses of the ARM were evaluated by sorting them by source and plotting them in FIGS. 2 and 3 by their respective CaO and $SiO_2$ without L.O.I. since that is the way how the ARM will be fed to the HCM. From FIGS. 2 and 3, it is clear that Air-cured ARM are very similar regardless of their source whereas the different Autoclaved ARM were chemically totally different. From each source, three samples were selected based on their L.O.I. namely the one with the lowest and highest L.O.I. and the one closest to the average L.O.I. of the specific source. For each source, the chemical analysis of the ARM closest to the average L.O.I. was used in the simulation program as also these samples were used as source for the experimental production of the different alternative clinker feed (Table 5). Furthermore the GC-MS and MS analysis were performed on these samples. The chemical analysis of the CCM in Table 6 and that of the Final Clinker in Table 10 shows that the mass percentages of the used ARM and CRM were properly assessed by the simulation program. The calculated CCM which are presented in Table 5, generate specific mass percentages for the 4 critical metal oxides that after decarbonation and sintering at 1450° C., give a chemical analysis similar to that of the targeted reference Clinker as presented in Table 3. The chemical influence on possible mineralogical differences between the Clinker based on the CRM and the Clinker partly produced with the ARM should therefore be minimal.

3.2. TGA/DTA Analysis

TGA/DTA analyses of the CRM are quite straightforward. The Limestone, Tufa and Marl have an endothermal decarbonation area between 700 and 900° C. which is quantified in Table 7.

A good match is found between XRF analysis and the $CO_2$ loss by TGA/DTA by comparing the $CaCO_3$ [weight %] derived from TGA analysis and the intrinsic $[Ca,Mg]CO_3$ [weight %] derived from XRF analysis. This indicates that Ca is almost completely present as $CaCO_3$. The decarbonation energy (Decarb E) of $CaCO_3$ can be derived from the known reaction enthalpy of 1782 kJ/kg for $CaCO_3$ and $CaCO_3$ [weight %] derived from TGA analysis. As can be noted in Table 7, the calculated decarbonation energies derived from the TGA relate in the same way as the decarbonation energies (µVs/mg) measured by DTA. A gain of mass is measured at about 1280° C. indicating oxidation of sulphides. Loam and sabulous clay also show a small but distinct quantifiable decarbonation area between 650 and 800° C. (Table 7). Here, a deviation between the $CaCO_3$ [weight %] derived from TGA analysis and $[Ca,Mg]CO_3$ [weight %] derived from XRF analysis is seen, indicating that not all Ca and Mg are present in a carbonated form. Whereas the Decarb E of $CaCO_3$ can be derived from the TGA/DTA analysis rather easily, the quantification of the loss of $H_2O$ (i.e. the amount of chemically bound water) is less easy. Assuming that there is no or only negligible amount of organic material present in loam or sabulous clay, the changes registered in the TGA which are normally attributed to the combined loss of organics and $H_2O$, may be considered to be mainly due to the evaporation of chemically bound $H_2O$. The $Fe_2O_3$ sources are more difficult to evaluate due to the fact that they mostly concern artificially made raw materials, derived from waste. In inert atmosphere, the loss of mass is 2 times bigger than in the presence of 5v % $O_2$ what indicates that the $Fe_2O_3$ sources perform oxidation reactions while heating. Comparison of the TGA/DTA curves under inert and oxidative atmosphere also

TABLE 7

TGA/DTA evaluation of all the used Classic Raw Materials (CRM) of CBR Antoing, CBR Lixhe and ENCI Maastricht

| | CRM | | | | | | | |
| --- | --- | --- | --- | --- | --- | --- | --- | --- |
| | Inorg $CO_2$ TGA Meas (weight %) | Organic + $H_2O$ TGA Meas (weight %) | $CaCO_3$ TGA Der (weight %) | Total CaO XRF Meas (weight %) | Total MgO XRF Meas (weight %) | Intrinsic $[Ca\bullet Mg]CO_3$ XRF Der (weight %) | Decarb E $CaCO_3$ µVs/mg Mat DTA | Decarb E J/g Mat TGA Der |
| CRM/Ant/RL | 39.9 | 1.0 | 90.8 | 50.09 | 0.9 | 90.8 | 226.2 | 1618 |
| CRM/Ant/PL | 34.9 | 1.2 | 79.4 | 42.87 | 1.1 | 78.9 | 219.4 | 1415 |
| CRM/Ant/IC | 4.8 | 4.0 | 11.0 | 6.20 | 0.3 | 11.7 | 28.5 | 196 |
| CRM/Ant/FA | 0.0 | 4.7 | 0.0 | 6.20 | 1.6 | 13.5 | 0.0 | 0 |
| CRM/Lxh/Tu | 39.5 | 3.4 | 89.8 | 51.75 | 0.7 | 92.2 | 251.8 | 1601 |
| CRM/Lxh/Li | 4.2 | 3.1 | 9.6 | 5.63 | 0.8 | 11.6 | 37.8 | 171 |
| CRM/Lxh/IC | 6.2 | 3.1 | 14.2 | 10.70 | 1.1 | 20.7 | 31.2 | 252 |
| CRM/Lxh/FA | 0.0 | 6.0 | 0.0 | 10.65 | 1.4 | 20.0 | 0.0 | 0 |
| CRM/Maa/Ma | 40.0 | 1.1 | 91.0 | 50.78 | 0.8 | 91.7 | 255.1 | 1622 |
| CRM/Maa/SC | 1.1 | 1.99 | 2.6 | 2.70 | 0.3 | 5.3 | 12.2 | 46 |
| CRM/Maa/IC | 4.1 | 1.1 | 9.4 | 18.40 | 1.4 | 32.0 | 6.6 | 167 |
| CRM/Maa/FA | 0.0 | 4.0 | 0.0 | 18.38 | 1.8 | 31.4 | 0.0 | 0 | indicates the areas were oxidation takes place: a first time between 700 and 900° C. and a second time between 1200° and 1300° C. Also nicely visible is the exothermic oxidation of FeO to $Fe_2O_3$ starting from about 280° C. because FeO is thermodynamically unstable below 575° C. TGA/DTA curves of the CRM/Lxh/IC and CRM/Maa/IC show small decarbonation reactions that can be quantified in the same way as for the other CRM (Table 7). The fly ashes have an opposite behaviour in the two atmospheres, with a bigger loss of mass in oxidative than in inert atmosphere indicating the presence of organic material. The mass loss in inert atmosphere indicates the formation of organic volatiles in absence of $O_2$. Because fly ash is a material which has had already a thermal treatment at high temperatures, no decarbonation-related mass losses are detected (Table 7). Because there is a loss of organic volatiles and $CO_2$ visible in the whole temperature range between 400° C. and 1450° C. under inert and oxidative atmosphere, the presence of char is indicated. TGA/DTA analyses of the fibre cement materials (Table 8) give a lot of information on their raw materials and how they will behave when thermally degraded up to 1450° C.

quantify the $CO_2$ part coming from the limestone filler of the air-cured products. Nicely visible is also the two-step degradation starting at 480° C. of PVA, present at about 1.7-1.9 weight % in the air-cured materials in FIG. 6 and the absence of PVA in the hydro-thermally hardened materials like plotted in FIG. 7. This indicates that reaction products of PVA will be formed when heated. Also perfectly quantifiable is the mass loss of the char that is generated by the thermal degradation of Cellulose between 800° C. and 1000° C. (FIGS. 7 and 8). The presence of char in the TGA/DTA analysis of the ARM, confirms the Broido-Shafizadeh reaction mechanism and therefore indirectly, the presence of levoglucosan. Furthermore, TGA/DTA coupled with XRF analysis makes it possible to calculate the $CO_2$ fraction originating from $[Ca,Mg](CO_3)_2$ and the associated energy consumption of each raw material presented in Tables 7 and 8. Unfortunately the gain in energy by the decomposition of organic components and the loss of energy coming from the decomposition of chemically bound $H_2O$ is not quantifiable by the performed analysis by TGA/DTA. By comparing the TGA/DTA analyses of the raw materials and the Cold Clinker Meals (CCM), the reduction of $CO_2$ emission as

TABLE 8

TGA/DTA evaluation of all the used Alternative Raw Materials (ARM) coming from fibre cement.

| | ARM | | | | | | | |
|---|---|---|---|---|---|---|---|---|
| | Anorg $CO_2$ TGA Meas (weight %) | Organic + $H_2O$ TGA Meas (weight %) | $CaCO_3$ TGA Der (weight %) | Total CaO XRF Meas (weight %) | Total MgO XRF Meas (weight %) | Intrinsic [Ca•Mg]$CO_3$ XRF Der (weight %) | Decarb E $CaCO_3$ μVs/mg Mat DTA | Decarb E $CaCO_3$ J/g Mat TGA Der |
| ARM/CS/S2 | 7.1 | 11.1 | 16.1 | 52.09 | 1.54 | 70.99 | 14.6 | 287 |
| ARM/CS/S3 | 9.6 | 12.7 | 21.9 | 49.99 | 1.36 | 70.22 | 22.5 | 389 |
| ARM/CS/S5 | 10.0 | 13.5 | 22.7 | 50.86 | 1.64 | 71.53 | 41.5 | 405 |
| ARM/RS/S3 | 7.7 | 9.8 | 17.5 | 52.55 | 1.62 | 71.81 | 26.9 | 312 |
| ARM/RS/S7 | 8.2 | 11.0 | 18.7 | 51.89 | 1.52 | 71.41 | 33.6 | 334 |
| ARM/RS/S9 | 7.9 | 11.6 | 17.9 | 52.20 | 1.56 | 71.53 | 32.9 | 319 |
| ARM/HDB/S8 | 0.6 | 16.1 | 1.4 | 28.20 | 0.67 | 42.32 | 5.3 | 25 |
| ARM/HDB/S9 | 0.5 | 16.8 | 1.1 | 28.62 | 0.59 | 42.67 | 9.7 | 20 |
| ARM/HDB/S11 | 0.5 | 15.8 | 1.2 | 28.53 | 0.67 | 42.68 | 8.6 | 21 |
| ARM/MDB/S5 | 0.3 | 14.3 | 0.6 | 24.83 | 0.79 | 38.28 | 4.8 | 11 |
| ARM/MDB/S6 | 0.3 | 14.5 | 0.6 | 25.24 | 0.75 | 38.73 | 5.2 | 10 |
| ARM/MDB/S11 | 0.2 | 16.6 | 0.6 | 25.12 | 0.59 | 38.35 | 4.2 | 10 |

The TGA peaks of the autoclaved ARM show the absence of limestone filler which is present for maximum 15 weight % in the air-cured materials. This makes it possible to well as the associated energy gain by the lowered endothermal decarbonation can be quantified like presented in Table 9.

TABLE 9

TGA/DTA evaluation of the Reference Cold Clinker Meals of CBR Antoing, CBR Lixhe and ENCI Maastricht

| | CCM | | | | | | | | |
|---|---|---|---|---|---|---|---|---|---|
| | Anorg $CO_2$ TGA Meas (weight %) | Organic + $H_2O$ TGA Meas (weight %) | $CaCO_3$ TGA Der (weight %) | Anorg $CO_2$ Der TGA Meas | $CaCO_3$ Der Mat TGA Meas (weight %) | Decarb E $CaCO_3$ μVs/mg Mat DTA | Decarb E $CaCO_3$ μVs/mg Mat DTA FM | Decarb E $CaCO_3$ Der J/g Mat TGA | Decarb E $CaCO_3$ Der J/g Mat TGA FM |
| CCM/Ant/Ref | 34.0 | 0.6 | 77.3 | 34.3 | 78.0 | 213.4 | 206.3 | 1378 | 1390 |
| CCM/Ant/FC | 29.7 | 4.8 | 67.6 | 31.7 | 72.1 | 190.5 | 179.7 | 1205 | 1284 |
| CCM/Lxh/Ref | 32.5 | 0.5 | 73.9 | 31.8 | 72.2 | 189.3 | 203.0 | 1318 | 1287 |

TABLE 9-continued

TGA/DTA evaluation of the Reference Cold Clinker Meals of
CBR Antoing, CBR Lixhe and ENCI Maastricht

| | CCM | | | | | | | | |
|---|---|---|---|---|---|---|---|---|---|
| | Anorg $CO_2$ | Organic + $H_2O$ | $CaCO_3$ | Anorg $CO_2$ Der | $CaCO_3$ Der Mat | Decarb E $CaCO_3$ | Decarb E $CaCO_3$ | Decarb E $CaCO_3$ Der | Decarb E $CaCO_3$ Der |
| | TGA Meas (weight %) | TGA Meas (weight %) | TGA Der (weight %) | TGA Meas | TGA Meas (weight %) | µVs/mg Mat DTA | µVs/mg Mat DTA FM | J/g Mat TGA | J/g Mat TGA FM |
| CCM/Lxh/FC | 16.9 | 9.3 | 38.4 | 19.5 | 44.3 | 105.9 | 115.3 | 685 | 800 |
| CCM/Maa/Ref | 34.2 | 0.0 | 77.7 | 33.9 | 77.0 | 219.3 | 215.7 | 1385 | 1373 |
| CCM/Maa/FC | 33.3 | 1.2 | 75.8 | 32.9 | 74.7 | 199.7 | 209.3 | 1350 | 1332 |

This is done by calculating the decarbonation energies of $CaCO_3$ out of the TGA/DTA analysis of the CCM and calculating the decarbonation energies derived of the TGA/DTA analysis of the raw materials taking in account the calculated compositions of Table 5. The fact that these two totally separated calculations gave a comparable result, proofs that the interpretation of the TGA/DTA analyses were objective as well as correct and could therefore be used to evaluate the $CO_2$ reduction as well as the gain in Decarb E by the use of the ARM.

3.3. XRD Analysis

The XRD analyses of the final clinkers are presented in Table 11 and show different weight percentages than those calculated by Bogue equations out of the chemical analysis of the final Clinker presented in Table 10.

TABLE 11

Mineralogical analysis by XRD of the Final Clinkers
produced in a static kiln in weight %

| Clinker | Cl/Ant/Ref | Cl/Ant/FC | Cl/Lxh/Ref | Cl/Lxh/FC | Cl/Maa/Ref | Cl/Maa/FC |
|---|---|---|---|---|---|---|
| Alite ($C_3S$) | 64.52 | 64.50 | 65.04 | 62.72 | 71.33 | 70.58 |
| Belite ($C_2S$) | 19.73 | 20.61 | 14.93 | 17.61 | 8.56 | 9.79 |
| Aluminate | 1.79 | 2.58 | 3.68 | 1.56 | 4.64 | 4.22 |
| Ferrite ($C_4AF$) | 12.86 | 11.23 | 15.87 | 17.61 | 14.89 | 14.53 |
| Free Lime | 0.23 | 0.51 | 0.23 | 0.28 | 0.35 | 0.75 |
| Periclase | 0.39 | 0.19 | 0.18 | 0.22 | 0.23 | 0.13 |
| Arcanite | 0.32 | 0.20 | 0.07 | — | — | — |

Like stated in paragraph 3.1, the chemical analyses were in the line of the expected and in the line of the average values of the clinkers produced in the first 6 months of 2011 on the 3 factory sites like presented in Table 3. The difference between the $C_3A$ and the $C_4AF$ measured with XRD and the corresponding values calculated with the Bogue equations stems from the method itself. The Bogue equations indeed are merely estimations which describe the phases formed when perfect clinker production conditions could be achieved. The XRD analysis indicates the actual mineralogical composition as it appears in the real clinker itself. Though, in view of the evaluation of the possible influence of the ARM on the mineralogy of the clinkers a reliable and objective comparison of the Classic Clinkers with the Alternative Clinkers can be done by any of these methods. For the kilns of CBR Antoing and ENCI Maastricht, it can be noted that the 13.28 weight % dosed Autoclaved High Density Fibre cement Boards ARM (Antoing) or the 6.01 weight % dosed Autoclaved Medium Density Fibre cement Boards ARM (Maastricht) had no significant influence on the mineralogy of the clinker (Tables 10 and 11). In case of the CBR Lixhe kiln, it can be noted that the alite [weight %] of the alternative clinker (Cl/Lxh/FC) is lower compared to the classic clinker (Cl/Lxh/Ref) for XRD analyses and Bogue calculations. Because the difference in alite [weight %] between Cl/Lxh/Ref and Cl/Lxh/FC is bigger by XRD analysis (−2.32 weight %) than by Bogue calculation (−1.6 weight %), it may be concluded that the difference in alite [weight %] doesn't originate from a small difference in the chemical composition of both clinkers only. In fact, this difference indicates that most probably, for equal chemistry, there still would be an influence of the air-cured ARM on the mineralogy of the alternative clinker. From Table 10, it can be noted that the alternative clinkers of CBR Lixhe were quite high in $SO_3$ compared to the reference clinker, but lower than calculated with the simulation program (Table 4). The same can be remarked for the clinkers of CBR Antoing where both the reference as well as the alternative clinkers were high in $SO_3$ but lower than calculated. Also the alkali contents of all clinkers were lower than simulated. It can be noted that some of the DoS-factors (1) were out of equilibrium: both clinkers of CBR Antoing were still between the limits as also the alternative clinkers of CBR Lixhe but all clinkers of ENCI Maastricht and especially the classic clinker of CBR Lixhe had a DoS-factor that was too low. Like described in paragraph 2.1., an excess of alkali will decrease the viscosity of the melt by which the alite formation is increased. The reason for these deviations lies in the fact that the static kiln has other enrichment factors (2) than the real clinker kilns that were simulated by the simulation program like described in paragraph 2.1. In fact, the enrichment factors of a static kiln will be much lower than those of the real clinker kilns. There is no gas stream flowing in the opposite direction of the hot clinker meal (HCM) stream towards colder regions in the clinker kiln allowing alkali and $SO_3$ to return to the HCM flow like described in FIG. 5. Also the ratio between the gas volume above the HCM mass and the HCM mass itself is much bigger than in the real clinker kilns. Because the alkali have a higher volatility at 1450° C. than $SO_3$, they will be much lower in content in a static kiln and also $SO_3$ [weight %] will be lowered significantly. The decreased alite formation of the alternative clinker of Lixhe by the use of air-cured ARM, could therefore be explained by a difference in DoS-factor influence by the higher $SO_3$ [weight %], brought in by the air-cured ARM and at the other hand the influence of the static kiln on the volatility of $SO_3$ and alkali. In case of the real clinker kiln of CBR Lixhe with the real enrichment factors, the difference in alite formation could possibly be decreased. If the difference in DoS-factor would still be present, it could be countered by an adapted fuel mix. The conclusion after the evaluation of the XRD analysis is therefore that the use of fibre cement ARM doesn't influence greatly the chemical and mineralogical quality of the produced alternative clinker if compared with the use of Classic Raw Materials.

3.4. Estimation of the Influence on Enemy Consumption: Calorimetric Evaluation

As indicated in paragraph 3.2, the decarbonation energies were calculated and presented in Tables 8 and 9. These decarbonation energies together with the different gross calorific values of the CCM (paragraph 1.3.) and the selected fibre cement ARM determined by calorimetric analysis, were plotted in FIGS. 10 and 11. The average dry starting compositions of the four types of ARM give us the ratio between the 3 types of organic fibres in the air-cured ARM: cellulose, PVA and PP. In the autoclaved ARM, only cellulose is used as organic fibre. Unfortunately, these dry starting compositions could not be revealed. The TGA/DTA analysis of the selected ARM, made it possible to divide the loss of ignition between 100° C. and 1000° C. in a decarbonation part and an organic/chemically bound $H_2O$ part. Because the decarbonation part concerns $CO_2$, the part of the total C (Table 6) related to $CO_2$ can be calculated, revealing the C [weight %] related to the organic fibre(s). By the molecular mass of each organic fibre and the average ratio between the three types of organic fibres in the air-cured ARM, the weight % of the organic fibres in the ARM can be calculated. The total weight % of these organic fibres reveals, by using the organic/chemically bound $H_2O$ part measured by TGA/DTA, the chemically bound $H_2O$. The weight % of the organic fibres and chemically bound $H_2O$ in the alternative CCM can be deduced from the used weight % of ARM (Table 5) and were plotted in FIGS. 8 and 9. Cellulose has a net calorific value of about 17520 J/g, PolyVinylAlcohol (PVA) of about 21310 J/g, and Polypropylene (PP) of about 42660 J/g. The net calorific values of the CCM and the selected ARM generated out of the calculated weight % and the net calorific values of the organic fibres were plotted in FIGS. 8 and 9. It could be noted that the gross calorific values of the CCM and the used fibre cement samples are similar to the sum of the energies. This proofs that the calculations that were performed to determine the weight % of the organic fibres and therefore also the chemically bound $H_2O$ in the ARM and CCM, are representative for their compositions. We could estimate that the corrugated fibre cement sheets on average consists out of 7.8 weight % chemically bound $H_2O$, the fibre cement roofing Slates out of 6.5 weight %, the medium density fibre cement boards out of 8.4 weight % and the high density fibre cement board out of 9.5 weight %. The Portland cement [weight %] in the ARM could be calculated by using the average dry starting compositions and the chemically bound $H_2O$ [weight %] of the ARM which revealed the total paste [weight %] present in the ARM. The ratio chemically bound $H_2O$/paste [weight %] present in the selected ARM are 8.7 weight % for the roofing slate sample (ARM/RS/S7), 23.8 weight % for the high density fibre cement plate sample (ARM/HD/S8) and 20.4 weight % for the medium density fibre cement plate sample (ARM/MD/S5). Like presented in paragraph 1.2, the autoclaving production process will create the ideal circumstances to hydrate completely the cement, explaining the high chemically bound $H_2O$ [weight %]. These circumstances are not present in the air-cured production process which results in much lower chemically bound $H_2O$ [weight %]. In both production processes, other raw materials of the dry starting compositions like silica fume and wollastonite could form, in small quantities, hydration productions (paragraph 1.2). Like stated by Alarcon-Ruiz, the chemically bound $H_2O$ will be liberated between 100° C. and 550° C. Three major decomposition reactions will take place liberating $H_2O$: the decomposition of gypsum, ettringite and a part of the carboaluminate hydrates between 110° C. and 170° C., the loss of chemically bound $H_2O$ from the decomposition of the C—S—H and the other part of carboaluminate hydrates between 180° C. and 300° C. and finally the dehydroxylation of portlandite between 450° C. and 550° C. Two distinct endothermal energies could be distinguished out of the TGA/DTA analysis measured between 30° C. and 600° C. on cement pastes, like described in paragraph 1.3. The first between 150° C. and 250° C. and the second between 400° C. and 500° C. Also by TGA/DTA, the cement [weight %] and the chemically bound $H_2O$ [weight %] could be determined for each cement paste. The endothermal energies required to evaporate the chemically bound $H_2O$ were estimated by performing DSC analyses on these same cement pastes. These energies were subtracted with the calculated heat capacities of the available Portland cement [weight %] in the cement pastes and were plotted in FIG. 10 in function of the ratios chemically bound $H_2O$/paste. The specific heat constant for Portland cement is 0.84 KJ/Kg/K. A good linearity was found. By using the ratio chemically bound $H_2O$/paste [weight %] determined for the selected ARM, the energies necessary to perform these decomposition reactions in the selected ARM and alternative CCM were calculated by regression out of FIGS. 8 and 9. Nicely visible is the significant energy gain coming from the lowered endothermal Decarb E. There will also be a balance, in favour of the first, between the energy coming from the exothermal decomposition energies of the organic fibres and the energy loss coming from the decomposition of the chemically bound $H_2O$. It can safely be stated that energy gain due to the lowered endothermal Decarb E (Table 9) will be fully recuperated with a possible small recovery of the exothermal decomposition energy of the organic fibres.

3.5. GC-MS and MS Analyses

Two of the selected fibre cement ARM, ARM/RS/S7 and ARM/HD/S8 were heated up in three separated tests from room temperature to 390° C., 500° C. and 800° C. These temperatures were reached within a period of 3 minutes. The generated volatiles and gases were collected for 5 minutes from the moment the samples were being heated up after which they were inserted in a GC-MS and a MS for analysis. By comparing the integral calculation of the CO and $CO_2$ measurement graphs coming from the MS presented in FIG. 11, it is clear that the formation of the low molecular CO and $CO_2$ gases by thermal degradation of the air-cured and autoclaved ARM increases by higher maximum degradation temperatures like for thermal decomposition of cellulose. Although these calculations could be seen as arbitrary, they can objectively be used to compare the formation of CO and $CO_2$ gases of the three separated tests (390° C., 500° C. and 800° C.). Also the formation as well as the variety of the high molecular volatiles, measured by GC-MS, will increase when the maximum degradation temperature of autoclaved ARM is increased to 800° C. like demonstrated in FIGS. 12 and 13. Similar on what was found in literature on the thermal decomposition of cellulose, the total formation of high molecular volatiles increases when the maximum degradation temperature was increased from 390° C. to 500° C. According to the Broido-Shafizadeh mechanism, levoglucosan should be generated in high quantities. Unfortunately, the spectrum of levoglucosan was not detected in any of the six GC-MS measurements. Although the glass piping was isolated, there was a brown deposition towards the GC-MS. We suspect that this deposition descends from the levoglucosan. The pyrolytic behaviour of levoglucosan at 400° C. results in a vapour phase and a liquid/solid phase. In the vapour phase, levoglucosan will be converted to non-condensable gases (mainly CO and $CO_2$), while char and other condensable low molecular weight products were formed in the liquid/solid phase. This could explain the absence of levoglucosan in the GS-MS analysis. The GC-MS measurements of the air-cured ARM samples differ from those of the autoclaved ARM samples due to the presence of PVA and PP and the lower [weight %] of cellulose. Acetaldehyde should be generated above 420° C. by thermal degradation of PVA. The big variety of generated volatiles prevents the identification of acetaldehyde in the GC-MS measurements of the air-cured ARM. Although it was not possible to distinguish in a qualitative and quantitative way the different high molecular volatiles by GC-MS, this specific test proofs that introducing the fibre cement ARM in large quantities by the cold side of the clinker kiln is a bad idea. Even when the clinker kiln is quite modern an has a cyclone tower to heat up the CCM within minutes to 800° C., it may be that a lot of generated volatiles return by the gas stream to colder regions of the cyclone tower causing clogging if returned to their solid state or worse be emitted by the chimney causing an exceeding of the emission limits. The deposition in the glass tubing is a perfect example to endorse this statement. Therefore large quantities of fibre cement ARM should be introduced at a hot point like a pre-calciner or pre-heater where it will be heated up in seconds to 900° C. which will ensure a complete thermal degradation of the organic fibres.

4 Conclusions

As could be noted in the different paragraphs, fibre cement recycled materials is an interesting alternative raw material for Portland clinker production. It was shown that compared to a situation where pure limestone is used in the cold clinker meal, an inorganic $CO_2$ emission reduction as well as a decarbonation energy gain is possible. Furthermore, it was demonstrated that the chemistry and mineralogy of the final clinkers were not influenced significantly by the use of the fibre cement materials. Because of its compositional constancy, and by that its chemical stability, fibre cement is a valid raw material. However, when used in practice, these materials should be introduced at a hot point in the process, e.g. using a pre-calciner unit or a pre-heater unit, to ensure full thermal degradation of the organic fibres for physical and chemical reasons, like to avoid clogging of the filter system and exceeding organic volatile emissions levels. The potential energy loss by skipping the cyclone tower as energetically most profitable way of heating, should be minimal because the biggest energy consuming reaction in these cyclones, the decarbonation of $CaCO_3$, will almost not be present in fibre cement ARM. The possible energy gain for use of fibre cement versus limestone, coming from the exothermal degradation of organic compounds as also coming from the lowered decarbonation energy, were quantified. Together with the estimated energy consumption needed for the liberation of chemically bound $H_2O$, it was shown that using fibre cement as raw material for clinker production lowers the total required energy compared to the use of classic raw materials, without compromising neither on physical, chemical nor mineralogical properties. It should, together with the already available alternative fuels and raw materials, be considered as a way to get in line with the Cement Sustainability Initiative.

The invention claimed is:

1. A method for the production of cement clinker in a system comprising a cyclone tower with cyclones and with a pre-calciner unit wherein fuel is combusted to feed the cyclone tower with heat, a rotating drum kiln which has at least one feed end and which is heated by means of further fuel and a kiln riser duct leading from the kiln to the bottom of the pre-calciner unit, in which method raw clinker meal is passed through said cyclone tower to preheat it, said fuel is combusted in said pre-calciner unit to produce a hot zone in the cyclone tower wherein the raw clinker meal is heated to a temperature of at least 800° C. to calcine it, the heated and calcined raw clinker meal is fed from the cyclone tower via the feed end of the rotating drum kiln into this rotating drum kiln wherein the raw clinker meal is further heated to be molten and the molten raw clinker meal is subsequently cooled to produce the cement clinker, wherein a fibre cement material containing organic fibres is added in an amount of above 2 wt. % based on the total weight of raw clinker meal and fibre cement material to said raw clinker meal by feeding the fibre cement material containing organic fibres directly into the pre-calciner unit or via said kiln riser duct without being preheated in the cyclones of the cyclone tower and is heated in said pre-calciner unit or in said kiln riser duct in less than 5 seconds to a temperature of at least 800° C.

2. A method according to claim 1, wherein the fibre cement is added in a dry powdered form to said raw clinker material.

3. A method according to claim 2, wherein a rising gas stream is generated in the cyclone tower wherein the fibre cement material is dispersed in said dry powdered form.

4. A method according to claim 3, wherein said rising gas stream passes the pre-calciner unit, the gas contained in said rising gas stream having a retention time in the pre-calciner unit of at least 2 seconds.

5. A method according to claim 3, wherein the fibre cement material is removed from the rising gas stream by means of one of said cyclones and is supplied by this cyclone to the feed end of the rotating drum kiln.

6. A method according to claim 1, wherein the fibre cement material is heated up in less than 2 seconds to said temperature of at least 800° C.

7. A method according to claim 1, wherein the fibre cement material has an inorganic material content of at least 80 dry weight % based on the total dry weight of the fibre cement material.

8. A method according to claim 1, wherein the fibre cement material comprises fibre cement sheets, produced by Hatschek technology, which is milled into dry powdery form.

9. A method according to claim 1, wherein said fibre cement material is heated in said pre-calciner unit or in said kiln riser duct to a temperature of at least 900° C.

10. A method according to claim 3, wherein said rising gas stream passes the pre-calciner unit, the gas contained in said rising gas stream having a retention time in the pre-calciner unit of at least 3 seconds.

11. A method according to claim 6, wherein the fibre cement material has an inorganic material content of at 90 dry weight %, based on the total dry weight of the fibre cement material.

12. A method according to claim 1, wherein said fibre cement material is added in an amount of at least 10 wt. %, based on the total weight of raw clinker meal and fibre cement material.

* * * * *